(12) United States Patent
Feldman

(10) Patent No.: US 7,253,902 B2
(45) Date of Patent: Aug. 7, 2007

(54) WAVELENGTH DETECTOR

(75) Inventor: Mark Feldman, Redmond, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 374 days.

(21) Appl. No.: 10/814,755

(22) Filed: Mar. 31, 2004

(65) Prior Publication Data

US 2005/0219536 A1    Oct. 6, 2005

(51) Int. Cl.
*G01J 1/42* (2006.01)
*G01N 21/25* (2006.01)

(52) U.S. Cl. .................................. 356/416; 356/222

(58) Field of Classification Search ................ 356/222, 356/226, 300, 328, 319, 519, 416, 419; 398/26; 372/32; 250/226
See application file for complete search history.

(56) References Cited

U.S. PATENT DOCUMENTS

| | | | |
|---|---|---|---|
| 4,308,456 A | 12/1981 | Van Der Gaag et al. | |
| 5,627,648 A | 5/1997 | Garrett | |
| 5,729,347 A | 3/1998 | So | |
| 6,400,739 B1 * | 6/2002 | Auracher | 372/32 |
| 6,618,129 B2 * | 9/2003 | Dries et al. | 356/73 |
| 7,088,441 B2 * | 8/2006 | Nahum et al. | 356/416 |
| 2002/0126288 A1 | 9/2002 | Friberg et al. | |
| 2003/0053064 A1 * | 3/2003 | Nishimura et al. | 356/414 |
| 2003/0219250 A1 * | 11/2003 | Wein et al. | 398/26 |
| 2005/0201751 A1 * | 9/2005 | Yao | 398/26 |

* cited by examiner

*Primary Examiner*—Patrick Connolly
(74) *Attorney, Agent, or Firm*—Christensen O'Connor Johnson Kindness PLLC

(57) ABSTRACT

A radiation measurement device for determining a wavelength-related characteristic of radiation from a radiation source is provided. The device includes a wavelength-dependent optical element (e.g., bandpass filter), and an optical power-measuring detector (e.g., photodetector). At least one optical beam is incident onto a polarization-sensitive reflective and/or transmissive surface positioned along an optical path of the device, is transmitted by the wavelength-dependent optical element, and is received by the optical power-measuring detector along the optical path. The radiation measurement device further includes a linear polarizer placed along the optical path prior to the optical power-measuring detector. In operation, the linear polarizer ensures that the beam received from the polarization-sensitive reflective and/or transmissive surface has a substantially fixed state of polarization, regardless of the polarization state of the original incident optical beam, to thereby reduce or eliminate uncontrolled polarization-dependent errors in the radiation measurement device.

20 Claims, 17 Drawing Sheets

WAVELENGTH DETECTOR

FIELD OF THE INVENTION

The invention relates to a sensing device and, more particularly, to a method and system for measuring values related to the wavelength and/or frequency of a radiation source.

BACKGROUND OF THE INVENTION

Certain measurement applications require measuring the wavelength or frequency, or related shifts, of a radiation source to very high levels of resolution over a relatively small wavelength range. Examples include high resolution interferometric type encoders, various non-contact profilometer sensors, applications in the telecommunications industry, and spectroscopy, as well as general laboratory applications. In addition, for many applications, the measurement must be conducted within a small space and at a low cost. Several methods are commonly used for wavelength measurement, including spectrometers, interferometers, and transmission through optical filters.

FIG. 1A shows a simple known measurement system 10 for measuring wavelength shift using an optical bandpass filter. The measurement system 10 includes an input incident beam 12, a bandpass filter 14, a filtered beam 16, and a power detector 18. The input incident beam 12 is filtered by the filter 14 to produce the filtered beam 16. In this application, a bandpass filter 14 is not strictly required, as any optical element having a non-negligible wavelength transmission dependence (i.e., wherein radiation behaves differently according to its wavelength) can be used. The power of the filtered beam 16 is detected by the power detector 18.

FIG. 1B shows the transmission spectrum for the bandpass filter 14. The filter 14 is characterized by a central wavelength $\lambda_0$, as well as its full width half maximum (FWHM) wavelength $\Delta\lambda$. A point P is shown on the filter curve 20 at a wavelength X1 and a transmission level Y1. It can be seen that the point P is located on the steep part of the filter curve 20, and that slight changes in the wavelength can thus be sensed by measuring the change in the transmitted power, as is done by the power detector 18 of FIG. 1A. In this manner, once the filter curve 20 is established, the measurement system 10 of FIGS. 1A and 1B provides a simple configuration for determining a wavelength shift based on a transmitted power or intensity.

FIG. 2 illustrates a known measurement system 30 which offers certain improvements over the measurement system 10 of FIG. 1A. As shown in FIG. 2, the measurement system 30 includes a beamsplitter 34, a filter 38, and power detectors 42 and 46. An input incident beam 32 is split into two beams 36 and 44 by the beamsplitter 34. The first beam 36 is filtered by the filter 38 to produce the filtered beam 40. As before, in this application the filter 38 is not strictly required, as any optical element having a non-negligible wavelength transmission dependence can be used. The power of the filtered beam 40 is detected by the power detector 42. The power of the second beam 44 is detected by the power detector 46. By utilizing the outputs of the power detectors 42 and 46 to compute a ratio of filtered to non-filtered beam powers, deviations in the power in the incident beam 32 are nominally eliminated as error sources. In other words, in contrast to the measurement system 10 of FIG. 1A which was unable to differentiate between wavelength shifts and power source fluctuations, the measurement system 30 of FIG. 2 uses a power ratio signal which is insensitive to deviations in the incident power, and thus more reliably discriminates wavelength shifts.

FIG. 3A illustrates a known measurement system 50 which provides an alternative configuration for measuring wavelength shifts. Similar to the measurement system 30 of FIG. 2, the measurement system 50 utilizes the ratio between two power detectors to eliminate the incident power dependence. The measurement system 50 includes a beamsplitter 54, filters 58 and 66, and power detectors 62 and 70. An incident input beam 52 is split into beams 56 and 64 by the beamsplitter 54. The first beam 56 is filtered by the filter 58 to produce a filtered beam 60. The power of the filtered beam 60 is detected by the power detector 62. The second beam 64 is filtered by the filter 66 to produce a filtered beam 68. The power of the filtered beam 68 is detected by the power detector 70.

FIG. 3B illustrates two filter curves 80 and 82 which correspond to the filters 58 and 66, respectively. As shown in FIG. 3B, the filter curve 80 overlaps with the filter curve 82. In other words, the transmission spectrum of the filter 58 overlaps with the transmission spectrum of the filter 66. A point P2 is shown on the filter curve 80 at a wavelength X1 and a transmission power Y2, and a point P1 is shown on the filter curve 82 at the wavelength X1 and at a transmission power Y1. It will be appreciated that for wavelengths increasing from wavelength X1, the transmission power on the filter curve 80 is decreasing, while the transmission power on the filter curve 82 is increasing. Thus, the ratio between a transmission power Y1 corresponding to the filter 66, and a transmission power Y2 corresponding to the filter 58 is unique for a particular wavelength over the wavelength transmission spectrum that is shared by the two filters 58 and 66. By utilizing the outputs of the power detectors 62 and 70 to compute a ratio of filtered beam powers, deviations in the incident power may be largely eliminated. In addition, this configuration provides for improved sensitivity to wavelength changes.

However, either due to their inherent shortcomings described above, or due to their susceptibility to certain other errors described below, none of the systems described above are suitable for detecting wavelength with a very high accuracy, unless undesirable set-up and operating restrictions are imposed on their use. Thus, a need exists for a wavelength detection system and method that avoids such error susceptibilities, without the need for such undesirable restrictions.

SUMMARY OF THE INVENTION

In particular, the systems described above that compensate for power source fluctuations are susceptible to errors that depend on the polarization orientation of the input radiation. This is because P-polarized and S-polarized components of a beam of radiation are transmitted or reflected in different proportions when they are incident on a polarization-sensitive transmissive or reflective surface, such as a beamsplitter or filter at an angle that is not normal to the surface. Transmission and reflection gratings are also polarization sensitive, regardless of the input beam angle of incidence. In contrast to the foregoing wavelength detectors, the present invention recognizes that such errors are significant at a level of accuracy that can be provided by some of the embodiments described herein, and provides a system and method for reducing polarization-dependent errors in a radiation measurement device, such as a wavelength detector. Furthermore, various embodiments of the present invention also provide improved levels of error reduction for errors due to other causes, such as power variations and environmental parameters variations. Still further, various embodiments of the present invention provide particularly compact and stable radiation measurement devices.

It should be appreciated that, unless otherwise indicated by context, the term "polarization-sensitive surface" means any transmissive or reflective optical surface that transmits or reflects the P-polarized and S-polarized components of an input beam in different proportions, or alters the polarization state of an emerging beam relative to the incident beam. The polarization state may be changed, for example, by mixing the incident polarization states or by differentially absorbing the P-polarized and S-polarized components of the incident electric field. Polarization-sensitive surfaces may have a polarization sensitivity that is a function of the angle of incidence of an input, that is, a surface that is not polarization-sensitive at zero degree or normal angle of incidence, but may become polarization sensitive at non-normal angles of incidence. The addition of a transmissive or reflective grating to a surface may also make the surface polarization sensitive, even at normal angle of incidence.

Unless otherwise indicated by context, the term "transmitted" as used herein refers to the continued propagation of an optical beam along an optical path, regardless of whether the propagation is enabled by reflection, by transmission through a generally transparent (transmissive) material, by diffraction, or by any other known method of beam propagation. The term "angle of incidence" is used herein with reference to the angle between the nominal direction of an optical beam and the direction normal to an optical surface. If an optical beam is slightly diverging or converging at various points along its optical path, the nominal direction at such points may be estimated as the approximate direction of a central ray of the beam, or the approximate intensity-weighted average direction of the beam, or the like. The terms "first optical path", "second optical path" and so on, as used herein generally refer to the entire path, or any part of the entire path, that is followed by any radiation that is received by the corresponding "first optical power-measuring detector", "second optical power-measuring detector" and so on. Thus, in general, first and second optical paths may be regarded as coexisting and overlapping wherever their "source" radiation overlaps, even though a "second optical path" may not be described as such until a part of it is divided or split from a first optical path, in various descriptions herein.

In various embodiments of the present invention, a radiation measurement device for determining a wavelength-related characteristic of radiation from a radiation source is provided. In various exemplary embodiments, the radiation measurement device includes a wavelength-dependent optical element (e.g., bandpass filter), an optical power-measuring detector (e.g., photodetector), a polarization-sensitive reflective and/or transmissive surface, and one or more linear polarizers. At least a first optical beam is transmitted along a first optical path that includes the wavelength-dependent optical element, the polarization-sensitive reflective and/or transmissive surface, and the one or more linear polarizers, and arrives at a first optical power-measuring detector. The polarization-sensitive reflective and/or transmissive surface receives the optical beam and transmits it along the first optical path. The wavelength-dependent optical element modifies the optical power of the first optical beam before or after the polarization-sensitive reflective and/or transmissive surface, and the first optical beam is received by the optical power-measuring detector along the first optical path. The one or more linear polarizers are placed at selected locations along the first optical path prior to the first optical power-measuring detector to substantially eliminate polarization dependent errors. For example, the linear polarizer may be placed prior to or after the wavelength-dependent optical element, and further, two or more linear polarizers may be placed, for example, both prior to and after the wavelength-dependent optical element, if desired.

In accordance with one aspect of the invention, the inclusion of one or more linear polarizers ensures that the beam(s) incident onto the polarization-sensitive reflective and/or transmissive surface(s) is received and/or transmitted along an optical path with a substantially fixed state of polarization, regardless of the polarization state of the original input optical beam. Thus, polarization-dependent errors that may otherwise be caused can be significantly reduced or eliminated.

In various exemplary embodiments, the polarization-sensitive reflective and/or transmissive surface that receives the optical beam is a transmissive surface of the wavelength-dependent optical element or a surface of a beam dividing element included along the first optical path, such as a beamsplitter or a grating for example.

In various exemplary embodiments, the polarization-sensitive reflective and/or transmissive surface that receives the optical beam is the beam splitting surface of a beamsplitter, arranged at a non-normal angle of incidence. In one embodiment, the radiation measurement device further includes a second optical power-measuring detector, and the beamsplitter provides a second optical beam that is transmitted along a second optical path and arrives at the second optical power-measuring detector. In a further embodiment, a second wavelength-dependent optical element is provided and receives the second optical beam and modifies the optical power of the second optical beam before it arrives at the second optical power-measuring detector.

In one embodiment, the radiation measurement device includes a wavelength-dependent optical element (e.g., bandpass filter), and an optical power-measuring detector (e.g., photodetector). At least one optical beam is incident at a non-normal angle onto the wavelength-dependent optical element, and the optical beam exits the wavelength-dependent optical element to be received by the optical power-measuring detector along an optical path. The radiation measurement device further includes one or more linear polarizers placed at selected locations along the optical path prior to the optical power-measuring detector. For example, the linear polarizer may be placed prior to or after the wavelength-dependent optical element, and further, two or more linear polarizers may be placed, for example, both prior to and after the wavelength-dependent optical element, if desired.

In accordance with a further aspect of the present invention, the radiation measurement device further includes a beam dividing element, such as a grating or a partially reflective and partially transmissive beam splitting surface, or the like, placed along the optical path prior to the wavelength-dependent optical element. The beam dividing element splits an optical beam incident at the beam dividing element into first and second optical beams, wherein at least one of the first and second optical beams is incident at a non-normal angle onto the wavelength-dependent optical element. The radiation measurement device may further include first and second optical power-measuring detectors for receiving the first and second optical beams and outputting corresponding first and second signals. In various embodiments, a signal processing circuit which receives and processes the first and second signals to determine a signal ratio based on the first and second signals. In various embodiments of the present invention, the signal ratio is indicative of at least one of a radiation wavelength and a radiation frequency of a radiation input to the radiation measurement device.

In one embodiment, a single linear polarizer is placed prior to the beam dividing element. In another embodiment, the input radiation has a fixed polarization direction, and respective first and second linear polarizers having the same polarization orientation are located along the respective paths of the first and second optical beams, after the beam dividing element. In another embodiment, the input radiation has a fluctuating polarization direction, and respective first and second linear polarizers have the same polarization orientation, which is aligned either perpendicular to, or parallel to, a plane that is parallel to both the direction of the optical beam incident at the beam dividing element and the direction normal to the beam dividing surface (or plane) of the beam dividing element (at which the optical beam is incident at a non-normal angle of incidence). The respective first and second linear polarizers may be located along the respective paths of the first and second optical beams, anywhere after the beam dividing element and before the respective first and second optical power-measuring detectors. Unless the beam dividing surface is a grating surface, generally the orientation of the linear polarizers either perpendicular to, or parallel to, a plane that is parallel to both the direction of the incident optical beam and the direction normal to the beam dividing surface orients these polarizers so as to avoid mixing the S- and P-polarization components present in the first and second optical beams. When the polarizers are similarly oriented and the S- and P-polarization components are not mixed, that is, when the polarizers are oriented such that the first and second optical beams become nearly 100% S-polarized or nearly 100% P-polarized, the signal ratio based on the first and second signals is insensitive to the polarization direction of the input radiation.

In accordance with a further aspect of the invention, first and second wavelength-dependent optical elements are provided. The first wavelength-dependent optical element is placed along an optical path of the first optical beam, while the second wavelength-dependent optical element is placed along an optical path of the second optical beam. As before, in one embodiment, a single linear polarizer is placed prior to the beam dividing element. In another embodiment, the input radiation has a fixed polarization direction, and respective first and second linear polarizers having the same polarization orientation are located along the respective paths of the first and second optical beams, after the beam dividing element. In another embodiment, the input radiation has either a fluctuating or fixed polarization direction, and respective first and second linear polarizers have the same polarization orientation, which is aligned either perpendicular to, or parallel to, a plane that is parallel to both the direction of the optical beam incident at the beam dividing element and the direction normal to the beam dividing surface or plane of the beam dividing element (at which the optical beam is incident at a non-normal angle of incidence). The respective first and second linear polarizers may be located along the respective paths of the first and second optical beams, anywhere after the beam dividing element and before the respective first and second optical power-measuring detectors.

The present invention also provides a method for providing at least one signal usable for determining wavelength-related characteristics of radiation from a radiation source in a manner that is substantially independent of the orientation of the polarization of the radiation. The method comprises generally five steps. The first step comprises inputting a first optical beam from the radiation source along a first optical path that includes at least one polarization-sensitive surface, of any of the previously indicated types. The second step comprises receiving the first optical beam and outputting a first filtered beam from a first wavelength-dependent optical element along the first optical path. The third step comprises receiving the first filtered beam output by the first wavelength-dependent optical element with a first optical power-measuring detector placed along the first optical path. The fourth step comprises outputting a first detection signal from the first optical power-measuring detector. Finally, the fifth step comprises linearly polarizing the radiation included in the first optical beam and/or the first filtered beam. In various respective embodiments, the fifth step of linearly polarizing the radiation included in the first optical beam and/or the first filtered beam may occur at various respective points along the first optical path that are before the first optical power-measuring detector. The method of the present invention, including the step of linearly polarizing the radiation included in the first optical beam and/or the first filtered beam, significantly reduces or eliminates any polarization-dependent errors in one or more signals used for determining a wavelength-related characteristic of radiation.

In a further embodiment of the method, the first step further comprises deriving a second optical beam from the first optical beam, the second optical beam directed along a second optical path. The second step further comprises receiving the second optical beam and outputting a second unfiltered or filtered beam from a second wavelength-dependent optical element along the second optical path. The third step further comprises receiving the second unfiltered or filtered beam output by the second wavelength-dependent optical element with a second optical power-measuring detector placed along the second optical path. The fourth step further comprises outputting a second detection signal from the second optical power-measuring detector. Finally, the fifth step further comprises linearly polarizing the radiation included in the second unfiltered beam and/or the second filtered beam. In various respective embodiments, the fifth step, further comprising linearly polarizing the radiation included in the second unfiltered beam and/or the second filtered beam as well as that in the first optical beam and/or first filtered beam, may occur at various respective points along the first and second optical paths that are before the first and second optical power-measuring detectors.

In one variation of this embodiment, the method includes performing the fifth step prior to the first step using a linear polarizer before a beam dividing element. In another variation of the embodiment, the input radiation has a fixed polarization direction, and the method includes performing the fifth step after the first step and prior to the third step using respective first and second linear polarizers, which have the same polarization orientation and which are located along the respective paths of the first and second optical beams. In another variation of the embodiment, the input radiation has either a fluctuating or fixed polarization direction, and the method includes performing the fifth step after the first step and prior to the third step using respective first and second linear polarizers, which are both aligned either perpendicular to, or parallel to, a plane that is parallel to both the direction of the first optical beam incident at a beam dividing element that is used to derive the second optical beam and the direction normal to the beam dividing surface or plane of the beam dividing element.

In various embodiments of the method, the first wavelength-dependent optical element along the first optical path and the second wavelength-dependent optical element along the second optical path are the same element. In various embodiments of the method, the at least one polarization-sensitive transmissive and/or reflective surface is arranged at a non-normal angle of incidence relative to the first optical beam and includes at least one of a beamsplitter surface and a surface of a wavelength-dependent optical element.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 4:
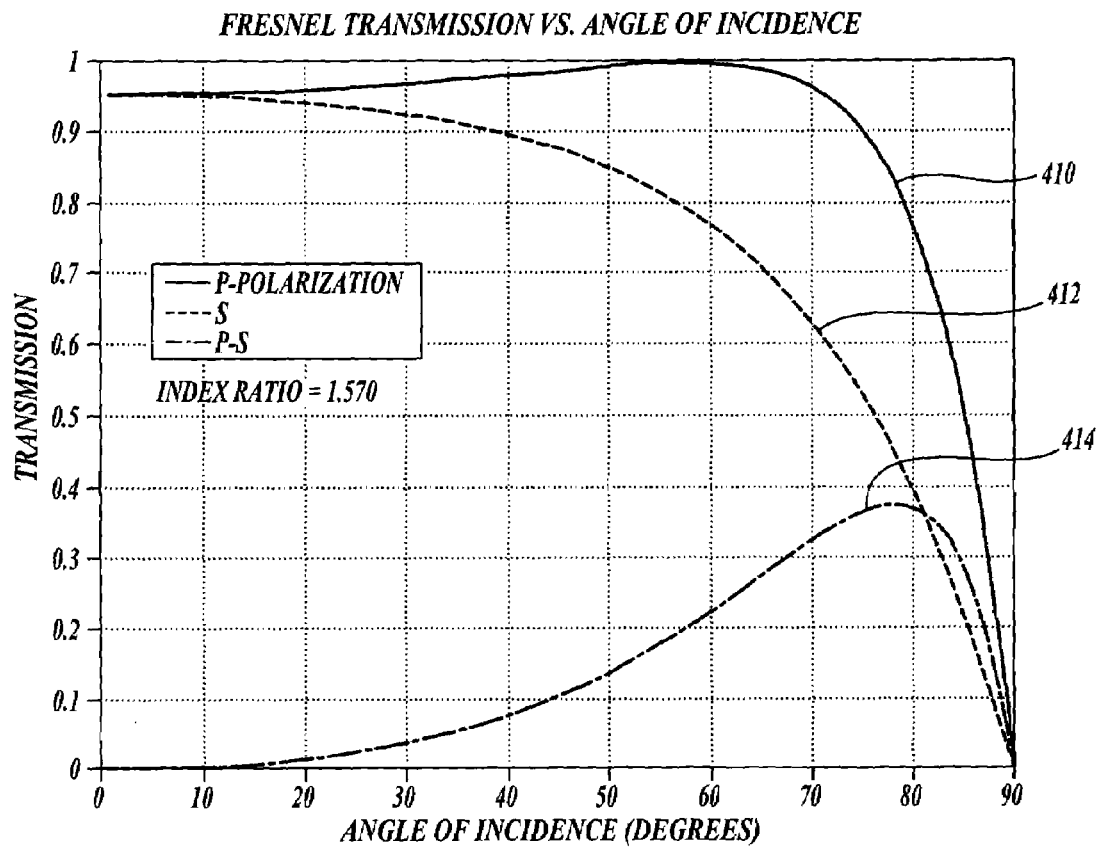
FIG. 4 is a graph illustrating that the transmission of light varies based on the light's angle of incidence and also on the light's polarization state.

In general, the proportion of incident radiation power that is transmitted by any polarization-sensitive reflective or transmissive surface, including a surface of a filter and/or a beam dividing element, is affected both by its angle of incidence and also by the polarization state of the radiation (i.e., the relationship between its P-polarized component and S-polarized component). FIG. 4 illustrates how the transmission of a light beam through an air/glass interface, with the glass having a refractive index of 1.57, varies based on an angle of incidence, and also based on the polarization state of the light beam. Transmission curves 410 and 412 correspond to incident light beams that are 100% P-polarized and 100% S-polarized, respectively. A curve 414 shows the difference in transmission between the transmission curves 410 and 412. At normal incidence (0° angle of incidence), the transmission characteristic of light is the same for both P-polarized polarized and S-polarized light 410 and 412. As the angle of incidence increases, however, the transmission characteristic of P-polarized light differs from the transmission characteristic of S-polarized light.

It is also known that the transmission and diffraction characteristics of P-polarized light differ from the transmission and diffraction characteristics of S-polarized light for transmissive or reflective gratings, regardless of the angle of incidence. Such effects are briefly described in Chapter 9 of *Diffraction Grating Handbook 5th Edition*, by Christopher Palmer, published by Thermo RGL, Richardson Grating Laboratory, Rochester, N.Y. (2002), which is incorporated herein by reference.

Thus, for any light that has a non-zero angle of incidence onto any reflective and/or transmissive surface, and for light that is incident on a transmissive or reflective grating at any angle of incidence, the overall transmission of the light depends on the light's polarization state, i.e., on the relationship between its P-polarized and S-polarized components. Accordingly, the varying, generally unknown polarization state of incident light can contribute to subtle measurement errors in various wavelength detectors that use such components and or arrangements. Additional measurement errors can arise due to the influence of fluctuating environmental parameters (temperature, humidity, etc.) on the operation of various components of the prior art wavelength detectors.

Figure 3A:
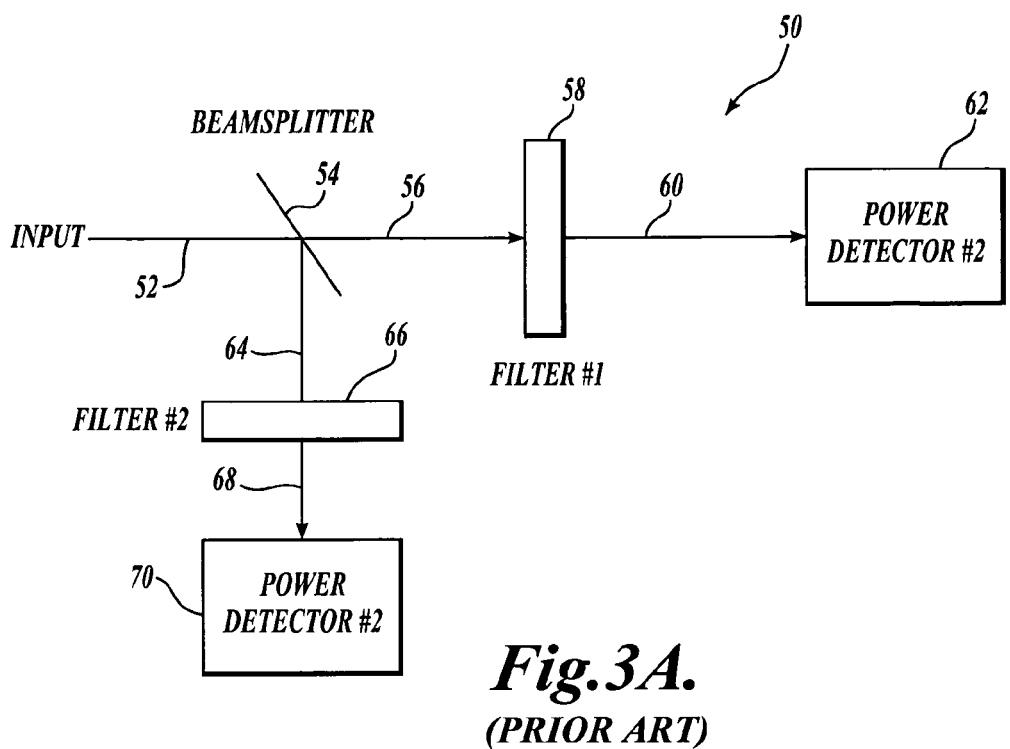
FIG. 3A is a block diagram of a third prior art system with two bandpass filters for measuring the wavelength (or wavelength shift) of a radiation source.
Figure 3B:
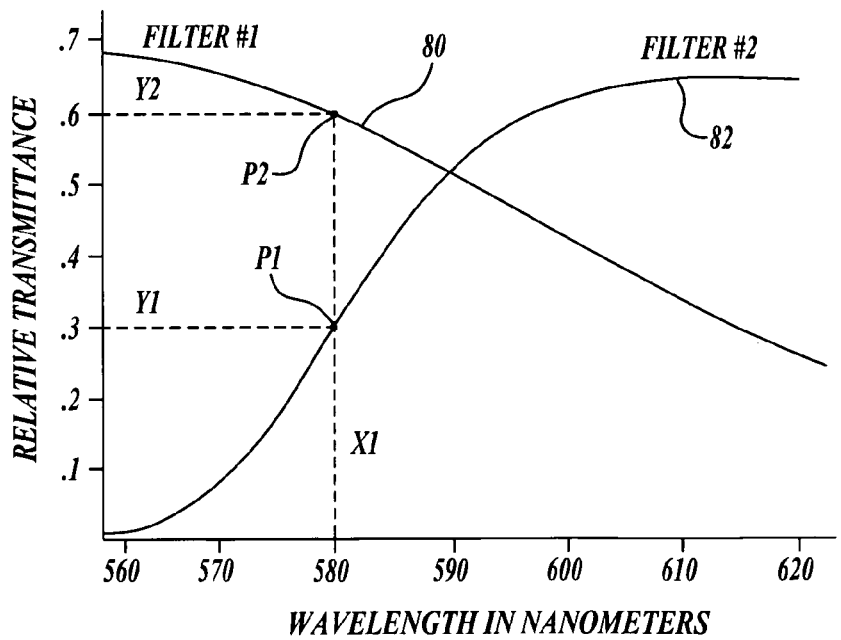
FIG. 3B shows the transmission spectra for the two bandpass filters of FIG. 3A.
Figure 5A:
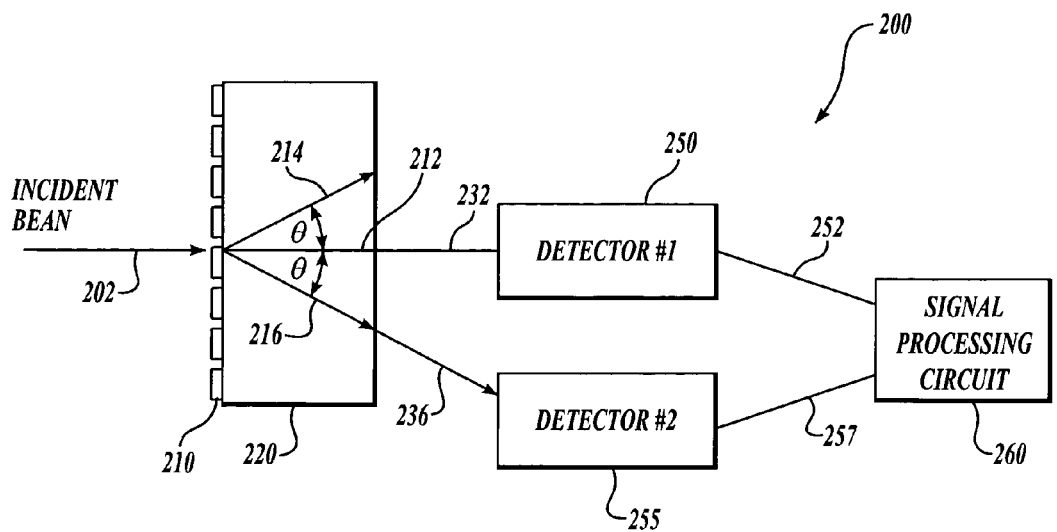
FIG. 5A is a block diagram of a system, including a filter structure and a grating, that is usable for measuring the wavelength (or wavelength shift) of a radiation source in various embodiments according to this invention.

FIG. 5A illustrates a measurement system 200 having an improved configuration for measuring wavelength or wavelength shifts with reduced errors despite fluctuating environmental parameters. The measurement system 200 includes a grating 210 which acts as a beam deflecting element, a filter structure 220, detectors 250 and 255, and a signal processing circuit 260. An incident input beam 202 is split by the grating 210 into a transmitted beam 212, and +/− first order angled beams 214 and 216. The transmitted beam 212 and the first order angled beam 216 pass through the filter structure 220 (or any other element having a non-negligible wavelength transmission dependence) to become a filtered beam 232 and an angled filtered beam 236, respectively, to provide two filtered signals from different filter paths. The filtered beam 232 is received by the detector 250, while the angled filtered beam 236 is received by the detector 255. The detector 250 and the detector 255 provide outputs 252 and 257, respectively, to the signal processing circuit 260. The use of the single filter structure 220 provides distinct advantage over the prior art system shown in FIG. 3A that utilizes a different filter for each beam. Specifically, the temperature sensitivities of the filter characteristics of each radiation path through the single filter structure are approximately identical, or at least highly correlated. Consequently, residual filter sensitivities along each radiation path due to temperature variations and other environmental effects can be reliably compensated for with high accuracy. In addition, the parts cost and complexity of the measuring system design is reduced. Some exemplary systems configurations based on the design principles of the embodiment shown in FIG. 5A are disclosed in co-pending, co-assigned U.S. patent application Ser. No. 10/251,449, filed Sep. 19, 2002, which is explicitly incorporated herein by reference.

Figure 5B:
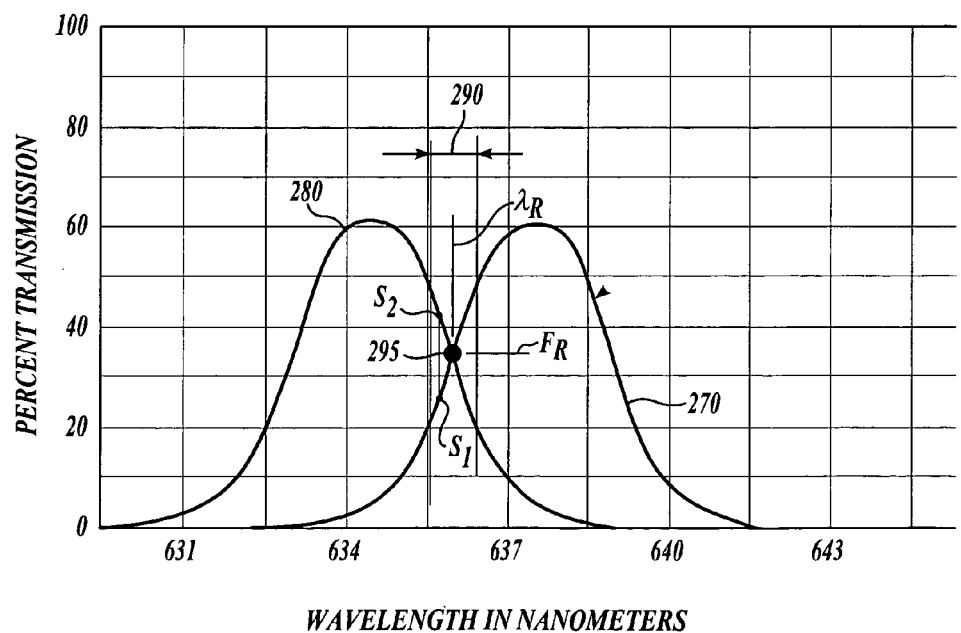
FIG. 5B shows the transmission spectra of the signals received from the filter structure of FIG. 5A.

FIG. 5B is a transmission spectrum diagram, showing the transmission curves 270 and 280 which correspond to the detectors 250 and 255 of FIG. 5A, respectively. Specifically, the transmission curve 270 corresponds to the filtered beam 232 based on an incident beam at 0° angle of incidence, while the transmission curve 280 corresponds to the angled filtered beam 236 based on an incident beam at a non-zero angle (θ) of incidence, which generally corresponds to the transmission curve 270 as shifted to a shorter wavelength region, as shown. FIG. 5B shows a desirable operating region 290 of the transmission curves 270 and 280, wherein both curves 270 and 280 are desirably, but not necessarily, substantially linear and coincide at a crossover point 295. The operating region 290 is a region where the signal curves 270 and 280 overlap, so that a single source wavelength gives rise to two useful output signals along the two respective optical paths through the same filter structure 220. Preferably, the signal curves 270 and 280 overlap and cross each other (at the crossover point 295 ) at approximately 50% of the maximum light transmission level, as shown, to ensure a useful operating region 290. Assuming that the operation region 290 is a linear region, for any wavelength in the operating range 290, the sum of two signals S1 and S2 will be nominally constant. At nominal, perfectly controlled operating conditions, either signal curve could be used to determine a wavelength to high accuracy. However, changes in each signal can arise from variations in the power of the incident beam, or from a change in the nominal gain of the detectors. Many such changes will be proportional for both signals in the measuring system. Thus, any wavelength in the operating range 290 can be accurately determined by normalizing the signals with respect to common-mode power and gain variations. For example, the effects of common-mode power and gain variations in each signal are effectively overcome by determining the wavelength as a function of a combined signal ratio. Even if the changes are not strictly proportional in both signals, calibration procedures can be applied to the signals so that common mode power and gain variations may still be eliminated.

Figure 6A:
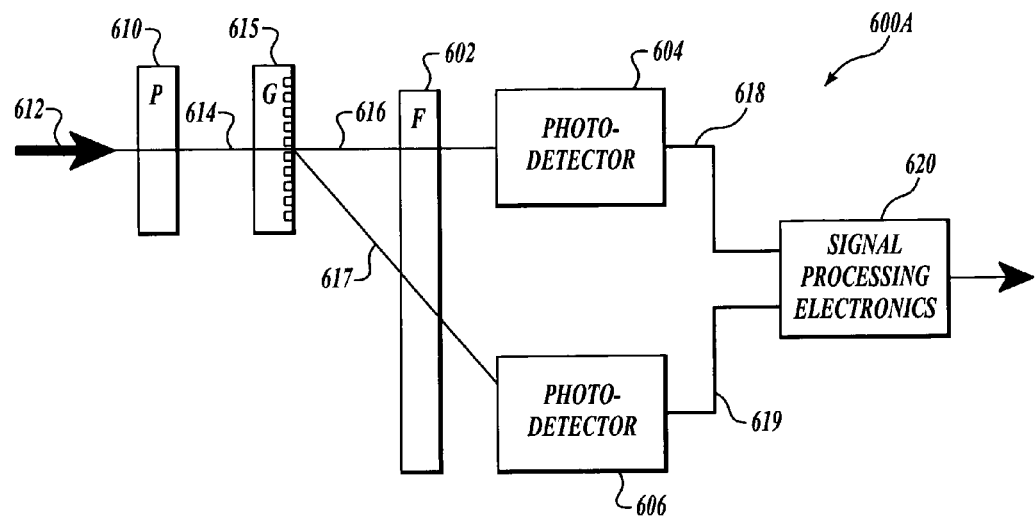
FIGS. 6A-6G are block diagrams of radiation measurement devices formed in accordance with the present invention, each including a grating, a wavelength-dependent optical element, and a linear polarizer for measuring a wavelength-related characteristic of a radiation source.

FIG. 6A illustrates one embodiment of a radiation measurement device 600a formed in accordance with the present invention for determining a wavelength-related characteristic (e.g., wavelength, wavelength shift, frequency, or frequency shift) of radiation from a radiation source (not shown). The radiation measurement device 600a of this embodiment is similar to the system described with reference to FIG. 5A above, except for the use of a polarizer, as will be described fully below. Specifically, the device 600a includes one or more wavelength-dependent (or wavelength-sensitive) optical elements 602, such as a bandpass filter or any other element having non-negligible wavelength transmission dependence. The device 600a also includes one or more optical power-measuring detectors 604 and 606, such as photodetectors. The device 600a further includes a linear polarizer 610 which, in the illustrated embodiment, is placed prior to, or on the incident side of, the wavelength-dependent optical element 602. In the present description, the term "prior to X" is used to refer to the relative position of an element that is provided on the incident side of X along an optical path. In this configuration as shown in FIG. 6A, an incident optical beam 612 from a radiation source (not shown) is polarized by the linear polarizer 610 into a polarized beam 614 having a substantially fixed state of polarization (i.e., having a fixed ratio of P-polarized and S-polarized components). The illustrated embodiment of the radiation measurement device 600a further includes a grating 615 placed between the linear polarizer 610 and the wavelength-dependent optical element 602, to split the polarized beam 614 into a transmitted beam 616 and an angled beam 617, both of which are thereafter filtered through the wavelength-dependent optical element 602 to be received by the optical power-measuring detectors 604 and 606, respectively. The signals 618 and 619 from the optical power-measuring detectors 604 and 606 are received by a signal processing unit 620 including electronics for processing the signals to determine a wavelength-related characteristic of the radiation from the radiation source. For example, a ratio between the two signals may be calculated to determine the wavelength or wavelength shift of the radiation.

The inclusion of the linear polarizer 610 ensures that the beam 614 incident on the grating 615, and hence the transmitted beam 616 and the angled beam 617 that are split by the grating 615 and are incident on the wavelength-dependent optical element 602, have a substantially fixed state of polarization, regardless of the polarization state of the original incident optical beam 612. Variations in the polarization state of the original incident optical beam thus lead only to proportional changes of optical power for the signals 618 and 619 output from the optical power-measuring detectors 604 and 606. Thus, polarization-dependent errors that may otherwise be relatively uncontrolled and unknown can be significantly reduced or eliminated.

Some design considerations for selecting and arranging a suitable polarizer (or polarizers) to reduce polarization-dependent errors, in accordance with the present invention, are now described. In general, the varying transmission percentage along the upper or lower edge of a transmission range (i.e., bandpass edge) of a wavelength-dependent element such as a filter (or any other element having non-negligible wavelength transmission dependence) gives rise to a varying transmitted power that sensitively discriminates a particular wavelength without modulating the wavelength. For the case of wavelengths in the range of a transmission bandpass edge towards the blue end of the spectrum, for a narrow bandpass dielectric filter used at a non-normal angle of incidence, the transmission curves $T_F^P$ and $T_F^S$ for P- and S-polarization, respectively, can be treated as though they are shifted relative to each other in wavelength by $\Delta\lambda$. The following can then be derived according to a simple linear model:

$$T_F^P(\lambda) = T_0^P + \alpha(\lambda - \lambda_0)$$

$$T_F^S(\lambda) = T_0^P + \alpha(\lambda - \lambda_0 - \Delta\lambda) \qquad \text{(Eqs. 1)}$$

where $T_0^P$ is the transmission at $\lambda = \lambda_0$ on the edge of the P-transmission curve. Dividing the total incident optical power I into its S- and P-polarized components will produce:

$$I_P = \epsilon_P I$$

$$I_S = \epsilon_S I$$

$$\epsilon_P + \epsilon_S = 1$$

$$0 \leq \epsilon_P, \epsilon_S \leq 1 \qquad \text{(Eqs. 2)}$$

Here $\epsilon_P$ and $\epsilon_S$ are the fractions of total incident optical power in the p and s polarization state, respectively. For a beam with a fixed state of polarization, the fractions $\epsilon_P$ and $\epsilon_S$ are constant. Assuming that the beam input to the filter has been transmitted from a beam dividing element (see, for example, FIG. 6A or 9A), the filter transmission optical power signal $S_F$, in the absence of an input polarizer, is given by:

$$S_F = [\epsilon_P * T_F^P + \epsilon_S * T_F^S] T_{BS} \sigma_F I \quad \text{(Eq. 3)}$$
$$= [T_0^P + \alpha(\lambda - \lambda_0) - \alpha * \Delta\lambda * \epsilon_S] T_{BS} \sigma_F I$$

where $T_{BS}$ is the beamsplitter transmission factor for the radiation that is transmitted to the filter and $\sigma_F$ is the detector sensitivity for the detector that provides the signal $S_F$.

Given an unfiltered signal $S_I = (1 - T_{BS}) \sigma_I I$, that is based on the remaining radiation from the beam dividing element (that is not transmitted to the filter) and that is directly proportional to the input optical power, the normalized signal $S_N$ is given by the following equation:

$$S_N \equiv \frac{S_F}{S_I} = [T_0^P + \alpha(\lambda - \lambda_0 - \Delta\lambda * \epsilon_S)] \frac{\sigma_F T_{BS}}{\sigma_I (1 - T_{BS})} \quad \text{(Eq. 4)}$$

where $\sigma_I$ is the detector sensitivity for the detector that provides the signal $S_I$. The normalized signal $S_N$ is independent of input beam optical power fluctuations, but results in a wavelength reading error $\delta\lambda$ for a polarization variation $\delta\epsilon_s$, given by the following equation:

$$\delta\lambda = -\Delta\lambda * \delta\epsilon_S \quad \text{(Eq. 5)}$$

For $\Delta\lambda = 0.2$ nm and $\delta\epsilon_S = 0.10$, we compute $\delta\lambda = 0.02$ nm, which represents a significant error in a high-precision wavelength measurement device. The polarization variation, $\delta\epsilon_S$, is any fixed or dynamic variation relative to an initial or calibration value $\epsilon_S$ shown in EQUATION 4. In various embodiments, the initial value $\epsilon_S$ is intentionally or implicitly established when an initial, reference, or calibration signal measurement is established in correspondence with an initial, reference, or calibration radiation wavelength. The error term $\delta\lambda$, however, vanishes when a polarizer is used to fix the polarization state of the light beam that is transmitted by the wavelength-dependent element, such that $\delta\epsilon_S \approx 0$.

It should be appreciated that fixing the polarization of the light beam with a polarizer either before it enters the wavelength-dependent element or after it leaves the wavelength-dependent element produces the same optical power signal in the resulting fixed-polarization beam. That is, the order of these two optical elements along an optical path is interchangeable and the same error reduction is provided for radiation measurement device configurations that provide a signal corresponding to the signal $S_F$ in the analysis outlined above. It should also be appreciated that although the foregoing discussion emphasized signal variations that arise from the polarization sensitivity of a wavelength-dependent element, more generally any surface of any optical element that transmits a light beam it receives at a non-normal angle of incidence will introduce similar polarization dependent signal variations, as will any diffraction grating that transmits a light beam it receives at any angle of incidence. Thus, the polarization of radiation transmitted by any non-normal surface along a critical optical signal path, or any grating, is fixed in a similar manner, in various exemplary embodiments according to this invention.

It should also be appreciated that to provide the error reduction outlined above according to this invention, following an initial, reference, or calibration signal measurement such as that described above, in order for the normalized signal $S_N$ shown in EQUATION 4 to be valid, the signal $S_I$ must change in the same proportion as the signal $S_F$ if the input radiation polarization changes. In various exemplary embodiments, a wavelength measurement device according to this invention is used in an application where the input radiation polarization does not change (though it may be unknown), and in such embodiments the configuration of the wavelength measurement device need not include a specific polarizer orientation in order to insure such a proportionality. However, in various other embodiments, to insure such a proportionality in the case of a fluctuating input radiation polarization, the radiation used to determine the signal $S_I$ is fixed at the same polarization orientation as that used to determine the signal $S_F$, and the polarization orientation is chosen such that the signal ratio based on the signals $S_I$ and $S_F$ is insensitive to the polarization direction of the input radiation.

In various embodiments this is accomplished by providing a polarizer that polarizes all radiation input to the wavelength measurement device with the same polarization. In various other embodiments, a plurality of similar polarizers, or portions of the same polarizer, are used to fix the same polarization orientation along the respective radiation paths used for determining $S_I$ and $S_F$. When a beam dividing element is used at non-normal angle of incidence to provide two respective radiation paths used for determining $S_I$ and $S_F$, respectively, the polarization orientation is aligned either perpendicular to, or parallel to, a plane that is parallel to both the direction of an optical beam that is incident on the beam dividing element and the direction normal to a beam dividing surface or plane of the beam dividing element. The polarizers may be located along the respective paths used for determining $S_I$ and $S_F$ anywhere after the beam dividing element and before the respective optical power-measuring detectors used to provide the signals $S_I$ and $S_F$. Unless the beam dividing element is a grating surface, generally the orientation of the linear polarizers either perpendicular to, or parallel to, a plane that is parallel to both the direction of the incident optical beam and the direction normal to the beam dividing surface orients them so as to avoid mixing the S- and P-polarization components present in the radiation transmitted along the radiation paths used for determining $S_I$ and $S_F$. When the polarizers are similarly oriented and the S- and P-polarization components are not mixed, that is, when the polarizers are oriented such that the first and second optical beams become nearly 100% S-polarized or nearly 100% P-polarized, the normalized signal $S_N$ is insensitive to the polarization direction of the input radiation. Various alternative configurations usable in various applications are described further below.

The use of one or more polarizers in a radiation measurement device for determining a wavelength-related characteristic of radiation is particularly advantageous because polarization change or shift may be caused by various sources, not limited to the causes related to a radiation source itself. Some potential sources of polarization change include, but are not limited to, laser output polarization (e.g., due to mode hops and/or mode competition); non-normal angle of incidence at optical train components (e.g., a phase shift from dielectric coatings of mirrors, beamsplitters, etc., that change with time and temperature); and even the use of a polarization-maintaining single mode fiber (e.g., imperfect input coupling resulting in elliptical polarization states at the output of the fiber and/or polarization mode coupling within the fiber, both of which can change with time due to mechanical or thermal perturbations).

Various polarizers may be used in a radiation measurement device formed in accordance with the present invention, as long as they are capable of transforming unpolarized light into polarized light. Some suitable polarizers include, but are not limited to, linear polarizing film (e.g., aligned long-chain polymers, typically dichroic plastic sheet laminated between plastic sheet or glass windows); metallic thin film (e.g., aligned metal spheroids, typically deposited between glass windows); dichroic linear glass polarizers (e.g., Polarcor™); thin film polarizers; wire grid; polarizing cube beamsplitters (e.g., dielectric film deposited between cemented or optically-contacted prisms); and Glan-Thompson calcite or other birefringenet crystal polarizers.

Figure 7A:
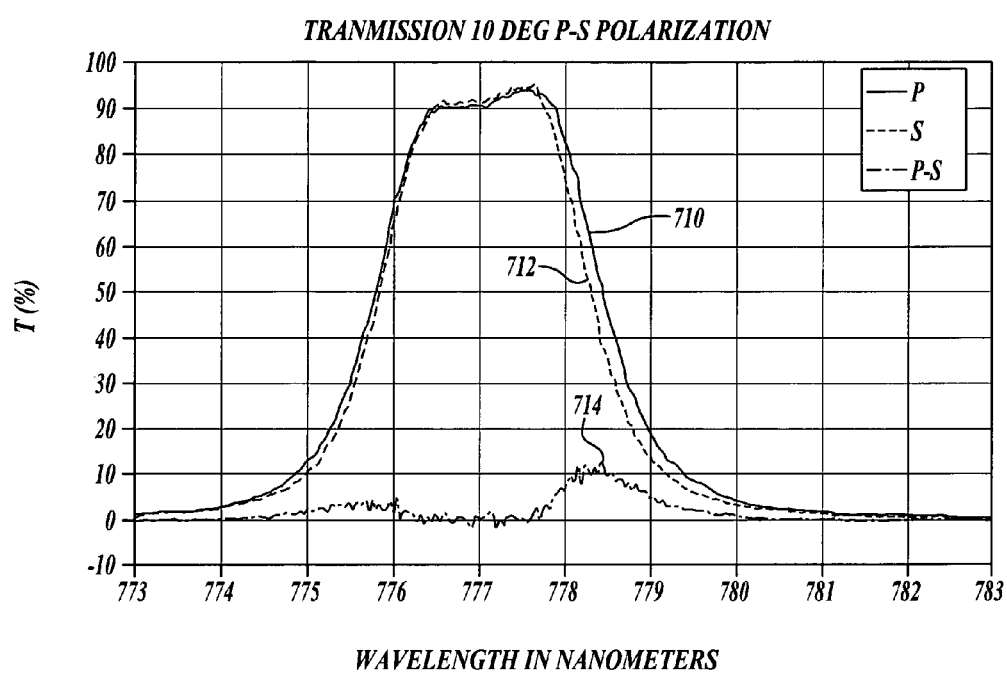
FIG. 7A is a graph illustrating the relation between the transmission of light through a commercial narrow band dielectric interference filter and the wavelength for P-polarized and S-polarized light, respectively, having an angle of incidence of 10 degrees.
Figure 7B:
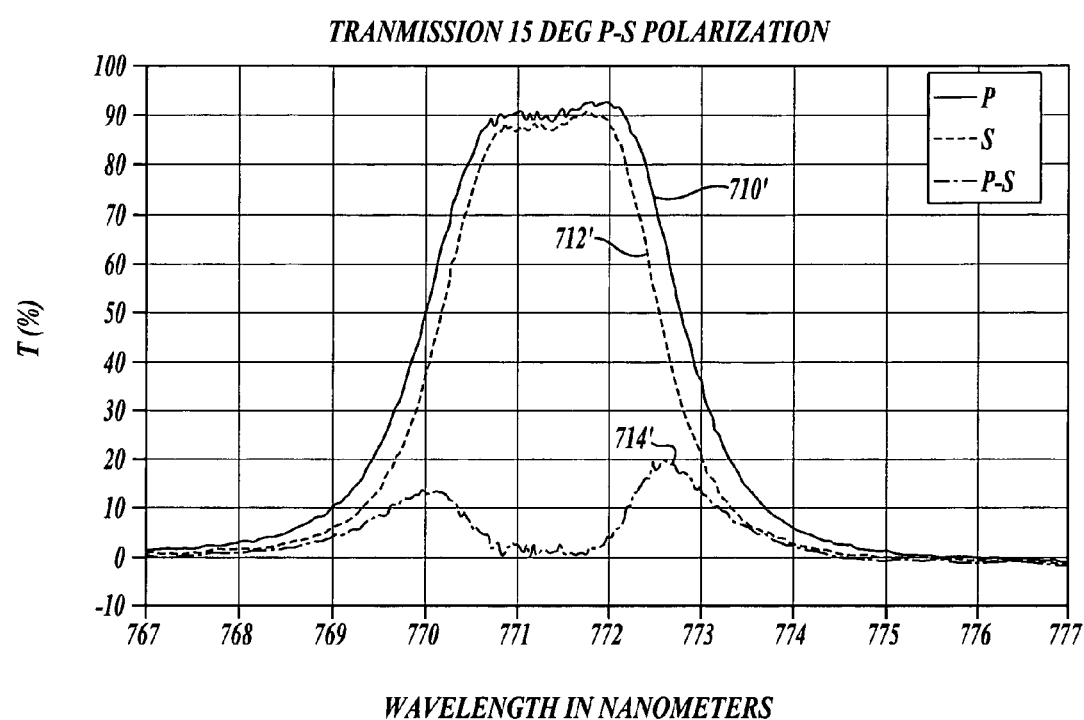
FIG. 7B is a graph illustrating the relation between the transmission of light through a commercial narrow band dielectric interference filter and the wavelength for P-polarized and S-polarized light, respectively, having an angle of incidence of 15 degrees.

FIG. 7A is a graph showing two transmission curves for a bandpass optical filter indicating the relation between the transmission of light and its wavelength. Specifically, it shows a P-polarized transmission curve 710 and a S-polarized transmission curve 712, for light having an angle of incidence of 10 degrees. The difference between the curves 710 and 712 is shown by a curve 714. FIG. 7B is a similar graph, but for light having an angle of incidence of 15 degrees. Comparison of FIGS. 7A and 7B shows that, as the angle of incidence increases, the effect of polarization state variations on the light transmission increases, and thus the potential for measuring errors due to the polarization state variations also increases. (See FIG. 4 above) Thus, the inclusion of a linear polarizer in a radiation measurement device, in accordance with the present invention, becomes relatively more important with the increase of the angle of incidence of light onto any reflecting and/or transmissive surface (e.g., a bandpass filter surface or a beamsplitter surface) along an optical path of the radiation measurement device.

Figure 8:
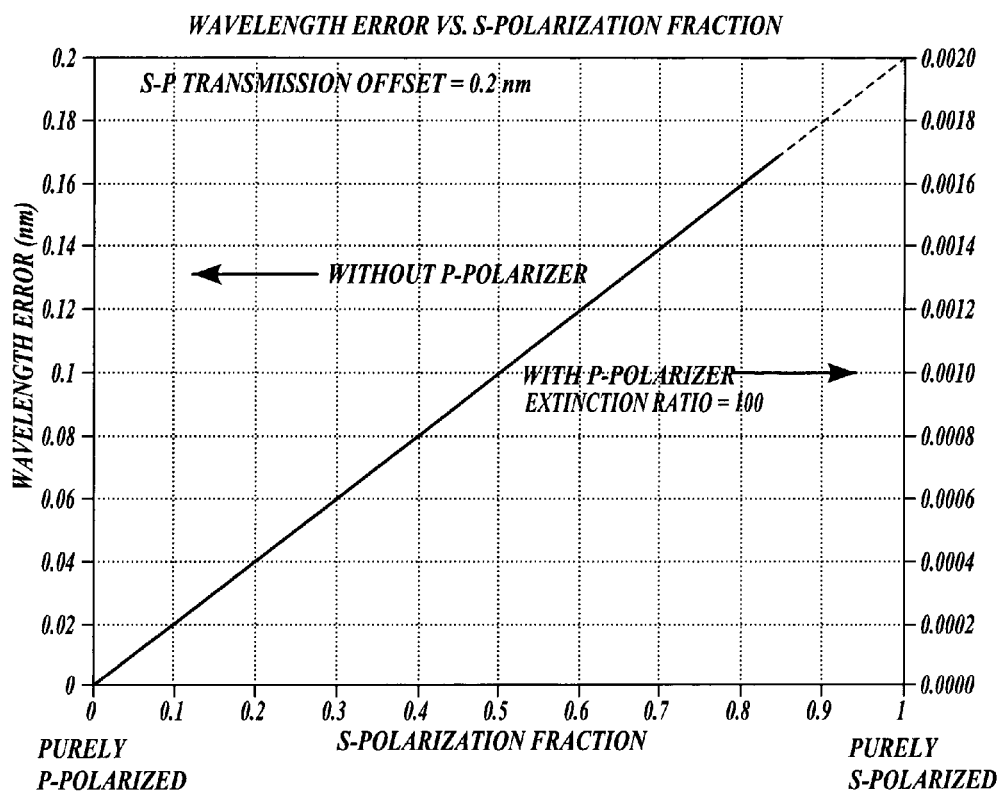
FIG. 8 is a graph showing the relation between wavelength measurement errors and S-polarized component fraction of light (0 to 1)

FIG. 8 is a graph showing the relation between wavelength measurement errors and S-polarized component fraction of light through a single bandpass optical filter. An S-polarization fraction of 0 indicates a purely P-polarized light beam while an S-polarization fraction of 1 indicates a purely S-polarized light beam. The wavelength measurement errors that occur when a P-polarizer is not used are indicated along the left-hand side vertical axis, while the errors that occur when a P-polarizer is used, in accordance with the present invention, are indicated along the right-hand side vertical axis. As shown by comparing the left and right vertical axes, the use of a P-polarizer reduces the wavelength measurement errors by the factor of 100, which equals the extinction ratio of the polarizer used in this calculation. To minimize the errors arising from polarization variations, it is preferable to use a polarizer having the largest possible extinction ratio. A similar graph may be created showing the relation between wavelength measurement errors and P-polarized component fraction of light, also. In this case, the use of a S-polarizer with a 100:1 extinction ratio is also expected to reduce the wavelength measurement errors by the factor of 100. Thus, in various embodiments of the present invention, either S-polarizer(s) or P-polarizer(s) may be used to achieve substantially the same wavelength measurement error reduction. In some applications, however, either S-polarizer(s) or P-polarizer(s) may be more efficient than the other and thus preferable in terms of wavelength measurement error reduction depending on, for example, the optical characteristics of particular elements (grating, beamsplitter, etc.) used. In these cases, a more efficient polarizer may be determined and/or verified by experiment or simulation in various exemplary embodiments.

It should be appreciated that for those embodiments in which a linear polarizer is located to polarize all the input radiation in a beam path before any polarization-sensitive reflective or transmissive surfaces, the polarizer may be oriented to mix S- and P-polarization components with no detrimental effects on device performance. However, for those embodiments in which linear polarizers are located after a polarization-sensitive transmissive or reflective surface, such as a beam dividing surface, or the like, it is preferred to orient all polarizers with the same orientation along either the S- or P-polarization direction, in order to avoid mixing differently proportioned S- or P-polarization components along different signal paths. Mixing the differently proportioned S- or P-polarization components that arise along different signal paths due to a polarization-sensitive transmissive or reflective surface, as described elsewhere herein, creates signals that have a signal ratio that is sensitive to the polarization of input radiation. As previously indicated, aligning a polarizer orientation either perpendicular to, or parallel to, a plane that is parallel to both the direction of an incident optical beam and to the direction normal to a non-normal angle of incidence surface, will provide a polarizer orientation that is along one of the S- or P-polarization directions, as desired. Similarly, aligning a polarizer orientation along or perpendicular to the grooves of a diffraction grating used at normal angle of incidence (as a beam dividing element, for example) will provide a polarizer orientation that is along one of the S- or P-polarization directions, as desired, when the diffraction efficiency has a significant S- or P-polarization dependence.

Figure 6B:
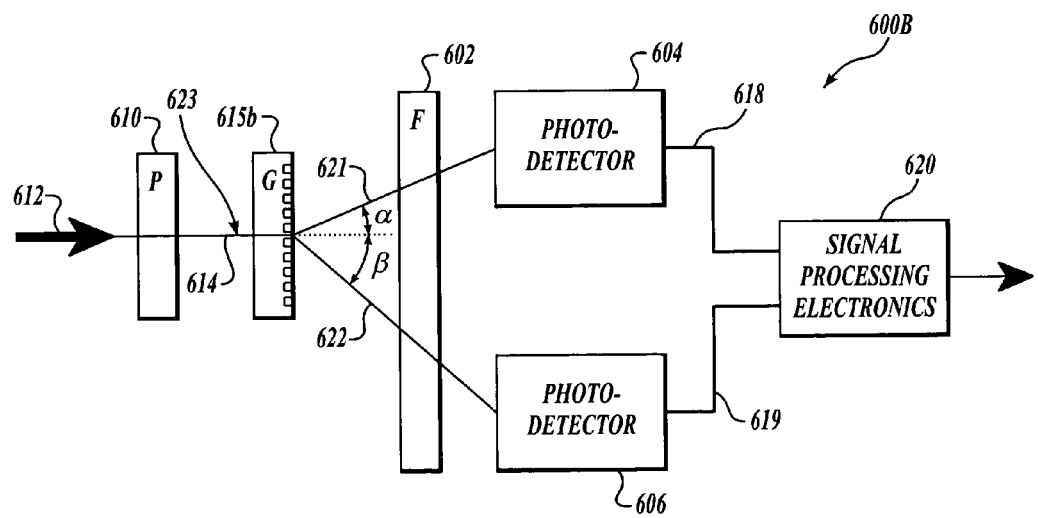

FIG. 6B shows an alternative embodiment of a radiation measurement device 600b formed in accordance with the present invention for determining a wavelength-related characteristic of radiation from a radiation source (not shown). In this embodiment, and further embodiments to be described hereafter, like elements as already described in reference to FIG. 6A are termed and numbered the same, and only the unique variation in each embodiment will be described in detail. In FIG. 6B, the radiation measurement device 600b is substantially similar to the radiation measurement device 600a of FIG. 6A, except that the grating 615b is configured and arranged to split the polarized beam 614 received from the linear polarizer 610 into two differently angled beams 621 and 622. The two differently angled beams 621 and 622 have angles α and β, respectively, relative to a common optical axis 623 of the polarizer 610 and the grating 615b. As long as the two angles α and β differ from each other, the signals 618 and 619 from the optical power-measuring detectors 604 and 606 are not identical to each other, and thus may be processed in a meaningful manner by the signal processing unit 620 to determine a wavelength-related characteristic of the radiation. It should be appreciated that the representations of some elements and surfaces in FIGS. 6A, 6B, and similar figures below, are schematic only, unless otherwise indicated by description or context. For example, to avoid potential polarization dependent effects at the surfaces of a window on the optical power-measuring detectors 604 and 606, in various embodiments they are oriented to be normal to the received radiation. Similarly, various polarizers represented as continuous single elements herein can instead be similarly oriented separate polarizers or separate segments of a polarizer, and can also be oriented normal to the incident radiation, if desired.

Figure 6C:
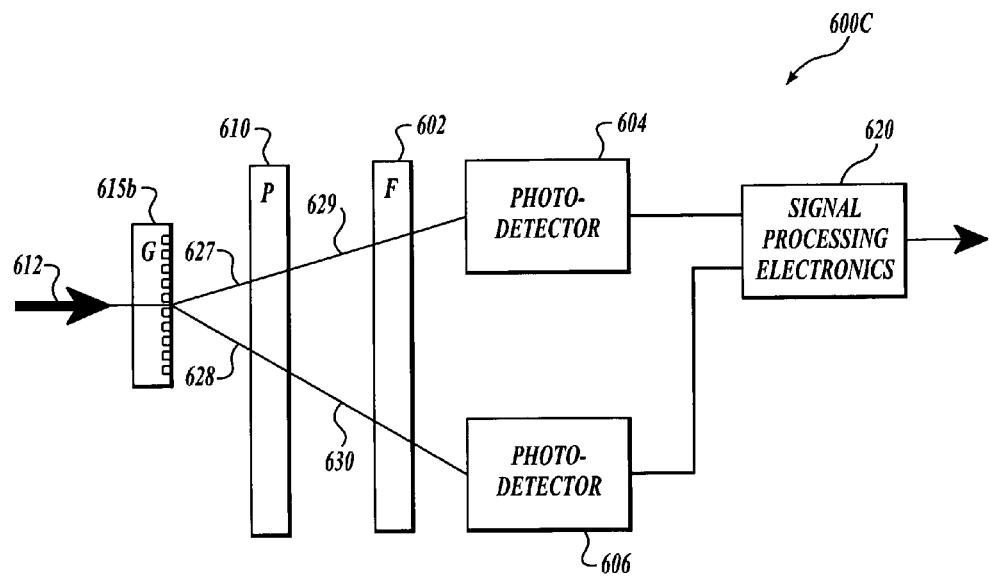

FIG. 6C shows a further alternative embodiment of a radiation measurement device 600c formed in accordance with the present invention for determining a wavelength-related characteristic of radiation from a radiation source (not shown). In this embodiment, the radiation measurement device 600c is substantially similar to the radiation measurement device 600b of FIG. 6B, except that the linear polarizer 610 is placed between the grating 615b that splits the incident optical beam 612 into two differently angled beams 627 and 628 and the wavelength-dependent optical element 602. This configuration is suited for use when the operation or diffraction of the grating 615b has an insignificant polarization dependence (or polarization sensitivity), or when the polarization orientation of the input radiation is fixed (but at an unknown angle). If the polarizer is oriented either parallel or perpendicular to the grating grooves, then this configuration is also suitable for use with a grating whose diffraction efficiency depends on polarization, that is, when the grating 615b has a significant polarization dependence. In FIG. 6C, the two differently angled beams 627 and 628 from the grating 615b advance through the linear polarizer 610 to become two beams with fixed linear polarization, beams 629 and 630, and then enter the wavelength-dependent optical element 602 at different angles of incidence. The filtered beams from the wavelength-dependent optical element 602 are received by the optical power-measuring detectors 604 and 606, respectively, and thereafter combined and processed by the signal processing unit 620 to determine a wavelength-related characteristics of the radiation.

Figure 6D:
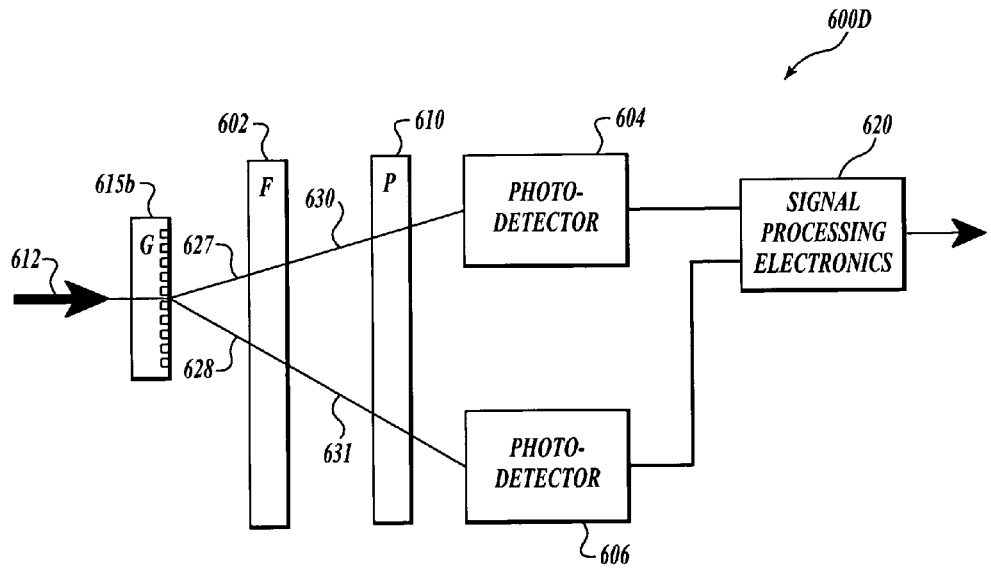

FIG. 6D shows a further alternative embodiment of a radiation measurement device 600d formed in accordance with the present invention for determining a wavelength-related characteristic of radiation from a radiation source (not shown). In this embodiment, the radiation measurement device 600d is substantially similar to the radiation measurement device 600c of FIG. 6C, except that the positions of the linear polarizer 610 and the wavelength-dependent optical element 602 are switched. Therefore, the two differently angled beams 627 and 628 from the grating 615b first enter the wavelength-dependent optical element 602 at different angles of incidence, and the filtered beams 630 and 631 from the wavelength-dependent optical element 602 enter the linear polarizer 610 to become polarized. The polarized beams from the linear polarizer 610 are received by the optical power-measuring detectors 604 and 606, respectively, and thereafter combined and processed by the signal processing unit 620 to determine a wavelength-related characteristic of the radiation. This configuration, wherein the linear polarizer 610 is placed after the wavelength-dependent optical element 602, is suitable for use when the operation of the grating 615b and the wavelength-dependent optical element 602 have an insignificant polarization dependence (or polarization sensitivity), or when the polarization orientation of the input radiation is fixed (but at an unknown angle). If the polarizer is oriented either parallel or perpendicular to the grating grooves, then this configuration is also suitable for use with a grating whose diffraction efficiency depends on polarization, that is, when the grating 615b has a significant polarization dependence. In some other embodiments of the present invention, depending on the quality of economically available polarizers, for example, it may be advantageous to place two linear polarizers, one in front of the wavelength-dependent optical element 602 or the grating 615b, and the other after the wavelength-dependent optical element 602.

Figure 6E:
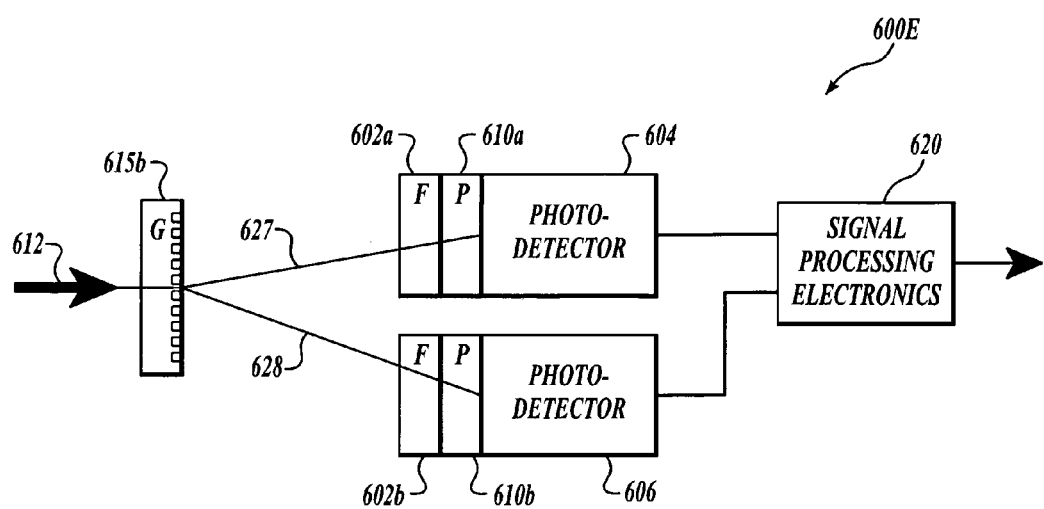

FIG. 6E shows a further alternative embodiment of a radiation measurement device 600e formed in accordance with the present invention for determining a wavelength-related characteristic of radiation from a radiation source (not shown). In this embodiment, the radiation measurement device 600e is substantially similar to the radiation measurement device 600d of FIG. 6D, except that the wavelength-dependent optical element 602 and the linear polarizer 610 that were commonly shared by both of the two differently angled beams 627 and 628 are replaced by two sets: one having a first wavelength-dependent optical element 602a and a first linear polarizer 610a, and the other having a second wavelength-dependent optical element 602b and a second linear polarizer 610b. As before, the two differently angled beams 627 and 628 from the grating 615b are filtered and polarized by its corresponding set of the wavelength-dependent optical element and the linear polarizer to be received by the optical power-measuring detectors 604 and 606, respectively. The signals from the two detectors 604 and 606 are then combined and processed by the signal processing unit 620 to determine a wavelength-related characteristic of the radiation.

Figure 6F:
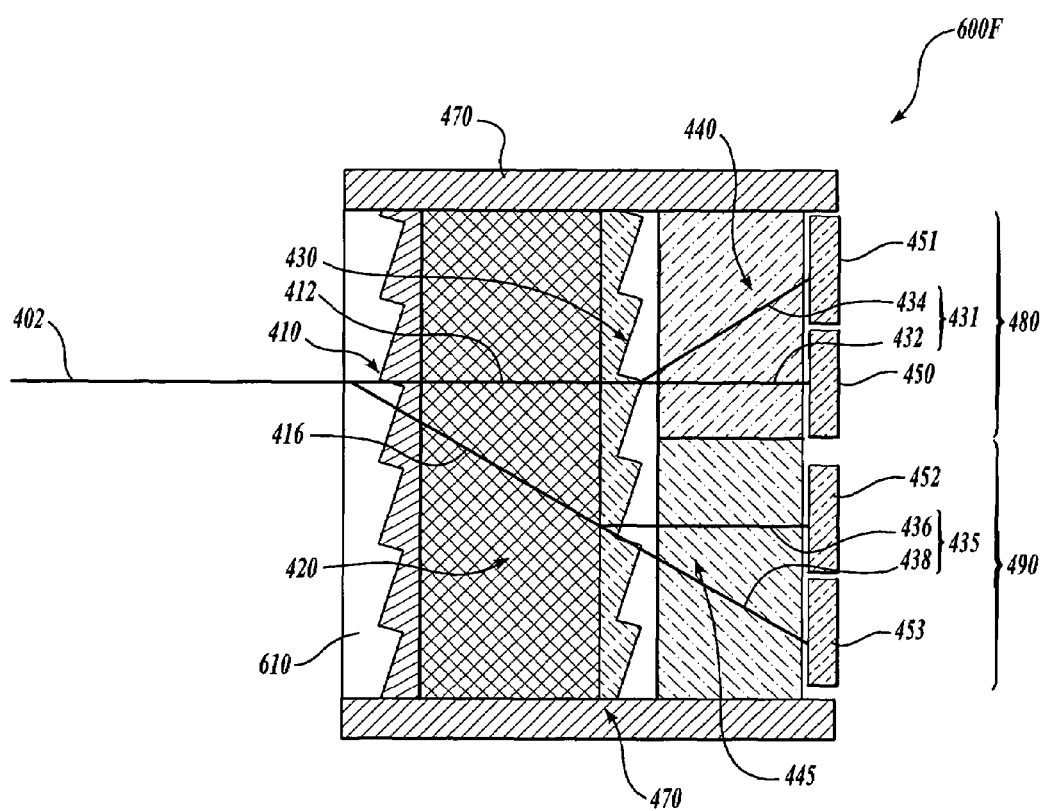

FIG. 6F shows yet another embodiment of a radiation measurement device 600f formed in accordance with the present invention for determining a wavelength-related characteristic of radiation from a radiation source (not shown). The radiation measurement device 600f is similar in configuration to the device 600a shown in FIG. 6A, except that it includes an additional grating to produce four separate light beams to be measured and processed. This configuration allows further improvements in the accuracy of the measurement device, as described in U.S. patent application Ser. No. 10/251,449, incorporated by reference above.

The radiation measurement device 600f includes a linear polarizer 610, first diffraction grating 410, an optically transparent substrate 420, second diffraction grating 430, wavelength-dependent optical elements (e.g., filter structures) 440 and 445, and a photodetector array with four photodetectors 450, 451, 452 and 453. All of these components are contained within a housing 470. An incident input beam 402 is polarized by the linear polarizer 610, and then split into an incident zero-th order beam 412 and an incident first order beam 416 by the first grating 410. After passing through the transparent substrate 420, the incident zero-th beam 412 is split by the second grating 430 to provide a first filtered beam pair 431 which includes a filtered beam 432 and an angled filtered beam 434. Similarly, the incident first order beam 416 is split by the second grating 430 to provide a second filtered beam pair 435 which includes a filtered beam 436 and an angled filtered beam 438. In the exemplary embodiment shown in FIG. 6F, the diffraction gratings 410 and 430 are blazed grating fabricated to the same specifications, except that one is reversed so that the blaze angle generates the four radiation beams 432, 434, 436, and 438 along operable directions approximately as shown in FIG. 6F. In one embodiment, the diffraction gratings 410 and 430 are blazed to produce radiation beams of equal efficiency in the zero-th and first order diffraction beams, while suppressing other orders, as is commonly known in the art for such diffraction gratings. It will be appreciated that the grating parameters such as the grating pitch are not shown to scale in FIG. 6F. The four radiation beams 432, 434, 436, and 438 are received by the four photodetectors 450, 451, 452 and 453, respectively, and the signals from the four photodetectors are combined and processed by a suitable signal processing unit (not shown) to determine a wavelength-related characteristic of the radiation.

Various signal processing methods and equations usable to process the signals from the radiation measurement device 600f, and/or signals from the various other radiation measurement device embodiments included herein, are disclosed in the incorporated U.S. patent application Ser. No. 10/251,449.

Figure 6G:
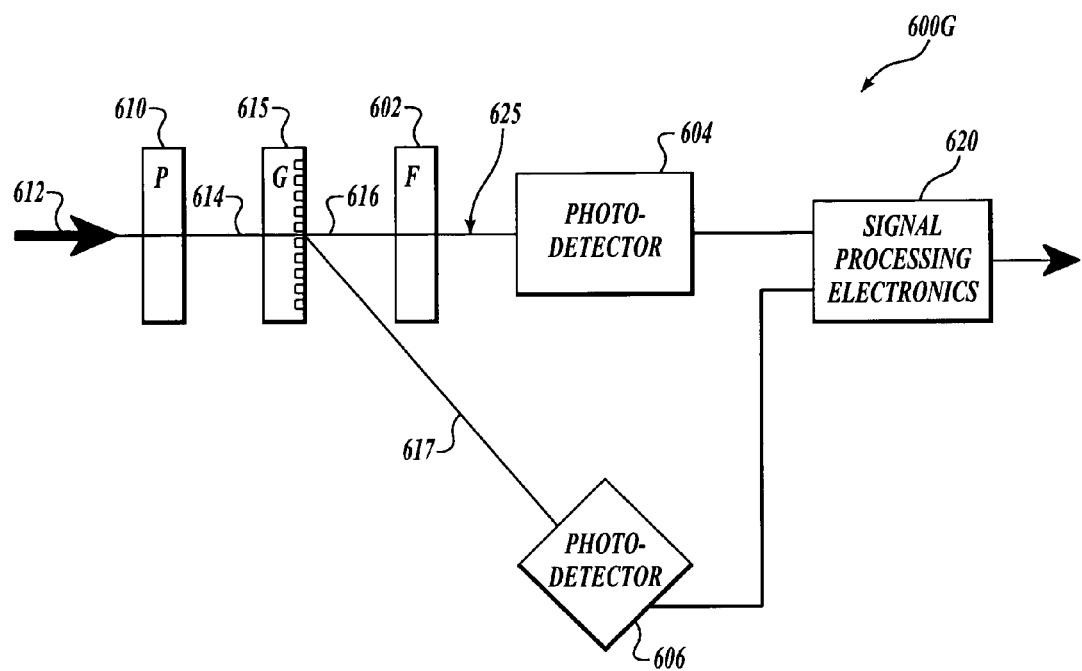

FIG. 6G shows an alternative embodiment of a radiation measurement device 600g formed in accordance with the present invention for determining a wavelength-related characteristic of radiation from a radiation source (not shown). In this embodiment, the radiation measurement device 600g is substantially similar to the radiation measurement device 600a of FIG. 6A, except that the wavelength-dependent optical element (e.g., filter) 602 is provided to receive and transmit only the polarized and transmitted beam 616 from the grating 615 at a normal angle of incidence. Since the linear polarizer 610 ensures that the beam incident on the grating 615 has a fixed state of polarization, any measurement errors that may otherwise arise due to the polarization dependence of the grating 615 will be reduced or substantially eliminated. The polarized and filtered beam 625 from the wavelength-dependent optical element 602 is received by the optical power-measuring detector 604. The polarized and angled beam 617, on the other hand, advances without going through the wavelength-dependent optical element 602 to be received by the other optical power-measuring detector 606. As before, the signals from the two optical power-measuring detector 604 and 606 are thereafter combined and processed by the signal processing unit 620 to determine a wavelength-related characteristic of the radiation. In FIG. 6G the photodetector 606 is explicitly oriented to emphasize one exemplary embodiment where all respective surfaces receive all respective input light beams at a normal angle of incidence. However, it should be appreciated that in such a configuration, the grating 615 is still a polarization-sensitive surface, as previously indicated. Thus, the use of the polarizer 610 according to this invention is still beneficial for reducing and/or eliminating undesirable polarization dependent errors in the radiation measurement device 600g.

Figure 1A:
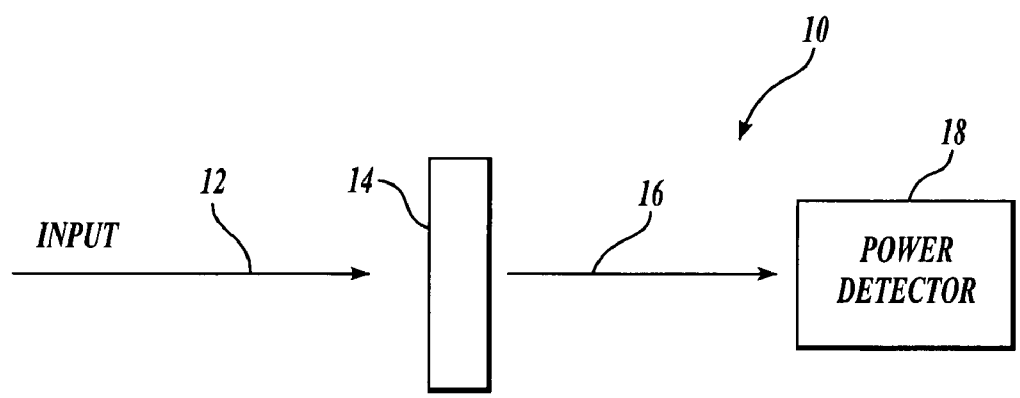
FIG. 1A is a block diagram of a prior art system including a bandpass filter for measuring the wavelength (or wavelength shift) of a radiation source.
Figure 1B:
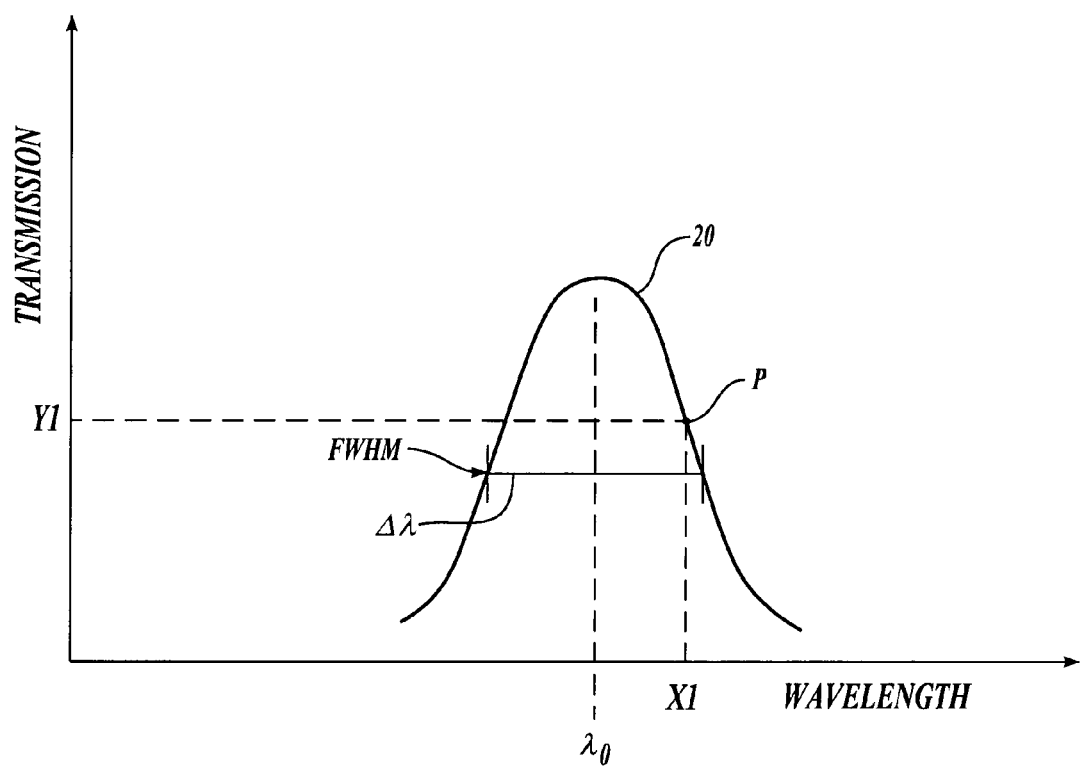
FIG. 1B shows the transmission spectrum for the bandpass filter of FIG. 1A.
Figure 2:
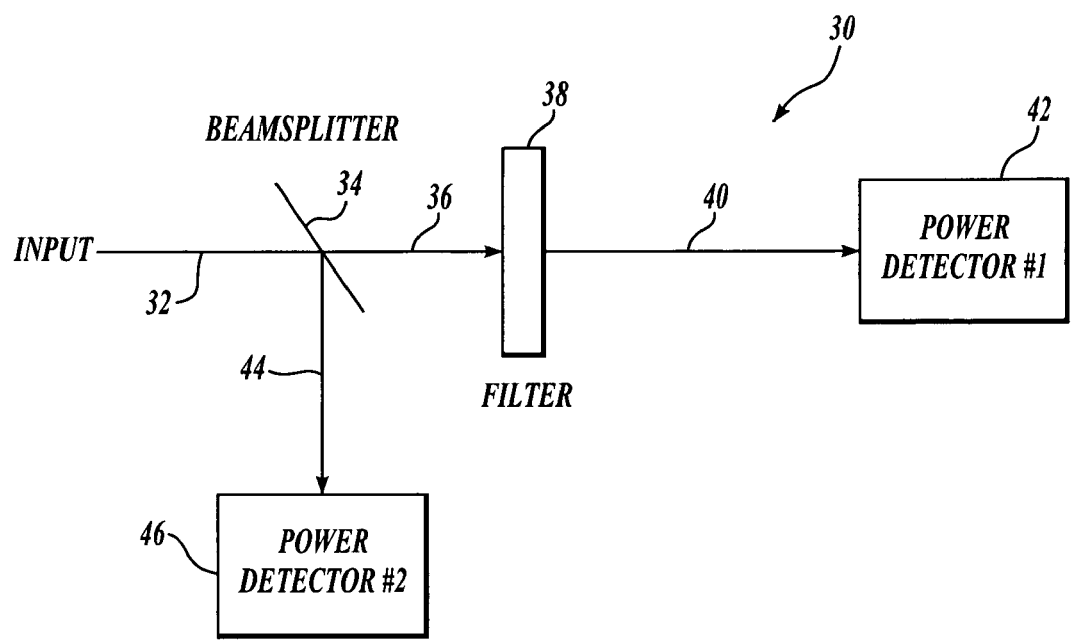
FIG. 2 is a block diagram of a second prior art system including a beamsplitter and a bandpass filter for measuring the wavelength (or wavelength shift) of a radiation source.
Figure 9A:
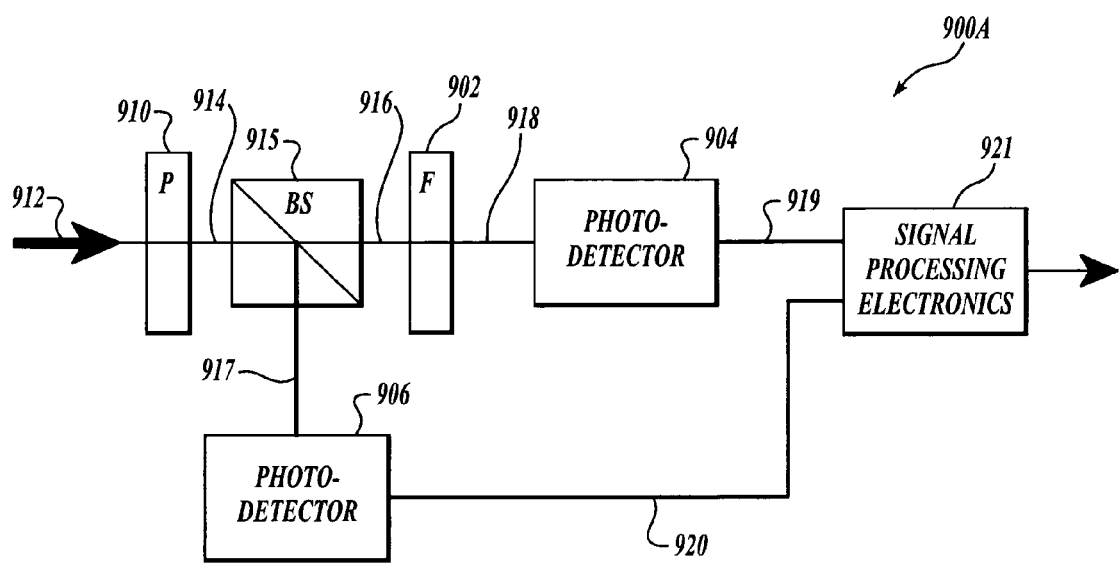
FIGS. 9A-9C are block diagrams of radiation measurement devices formed in accordance with the present invention, each including a beam divider, a wavelength-dependent optical element, and a linear polarizer.

FIG. 9A illustrates a further embodiment of a radiation measurement device 900a that includes a beamsplitter 915, and that is formed in accordance with the present invention for determining a wavelength-related characteristic (e.g., wavelength) of radiation from a radiation source (not shown). The radiation measurement device 900a of this embodiment includes a configuration that is similar to the prior art system including a beamsplitter described with reference to FIG. 2 above, except a linear polarizer 910 is added to the configuration according to the principles of this invention. Specifically, the device 900a includes the linear polarizer 910 placed in front of the beamsplitter 915, to receive an incident optical beam 912 to produce a polarized beam 914 that has a controlled polarization orientation relative to the various surfaces included along the optical paths of the radiation measurement device 900a. The polarized beam 914 incident on the beamsplitter 915 is divided into a zero-angle-of-incidence transmitted beam 916 and an angled beam 917, in the illustrated embodiment. The transmitted beam 916 is filtered by a wavelength-dependent optical element 902 to produce a filtered beam 918, and the power of the filtered beam 918 is detected by an optical power-measuring detector 904. The power of the angled beam 917 is detected by another optical power-measuring detector 906. As before, the signals 919 and 920 from the two optical power-measuring detectors 904 and 906 are combined and processed by a signal processing unit 921 to determine a wavelength-related characteristic of the radiation. This configuration, wherein the linear polarizer 910 is placed in front of the beamsplitter 915, is advantageous because the angled surface of the beamsplitter 915 has an inevitable polarization dependence, i.e., it splits the power of the incident beam differently for different polarization states of the incident beam. Since the linear polarizer 910 ensures that the beam incident on the beamsplitter 915 has a fixed state of polarization, any measurement errors that may otherwise arise due to the polarization dependence of the beamsplitter 915 are reduced or substantially eliminated. As previously indicated, in this configuration the polarizer may be oriented with any convenient orientation and, regardless, the device will be insensitive to polarization fluctuations of the input radiation (even if the S- and P-polarization components of the input radiation are mixed by an orientation.)

Figure 9B:
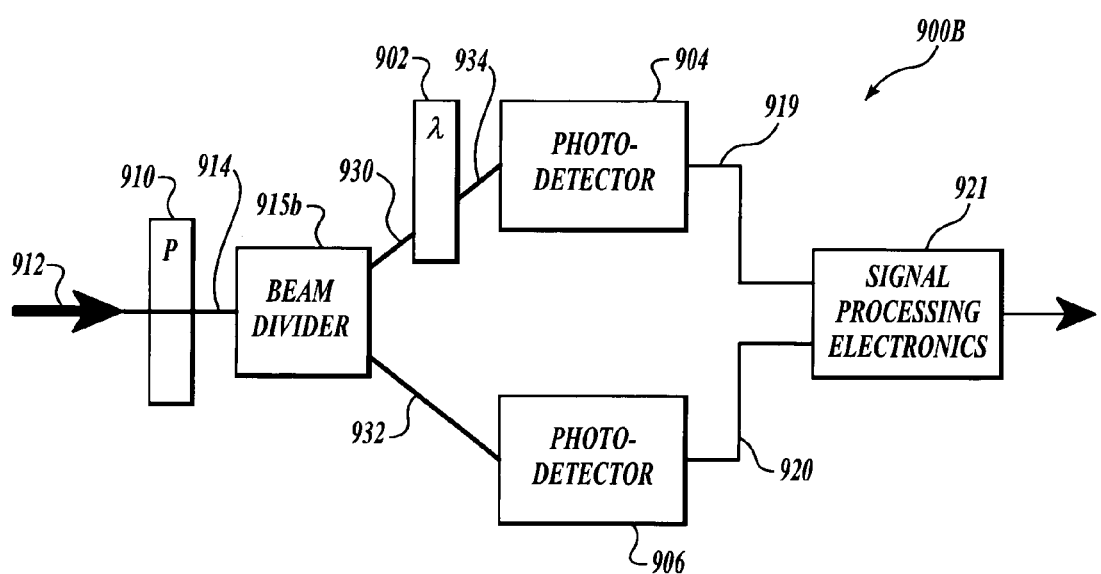

FIG. 9B shows a further alternative embodiment of a radiation measurement device 900b, including a beam divider 915b, formed in accordance with the present invention for determining a wavelength-related characteristic of radiation from a radiation source (not shown). The radiation measurement device 900b of this embodiment is similar to the radiation measurement device 900a of FIG. 9A, except that the beamsplitter 915 that splits the incident beam into a zero-angle-of-incidence transmitted beam 916 and an angled beam 917 is replaced with a more general beam divider 915b, which splits the incident beam into two beams 930 and 932 according to any operable pair of relative angles. The first beam 930 is filtered by a wavelength-dependent optical element 902 (e.g., a bandpass filter) to produce a filtered beam 934, and the power of the filtered beam 934 is detected by an optical power-measuring detector 904. The power of the second beam 932 is detected by another optical power-measuring detector 906. As before, the signals 919 and 920 from the two optical power-measuring detectors 904 and 906 are combined and processed by a signal processing unit 921 to determine a wavelength-related characteristic of the radiation.

Figure 9C:
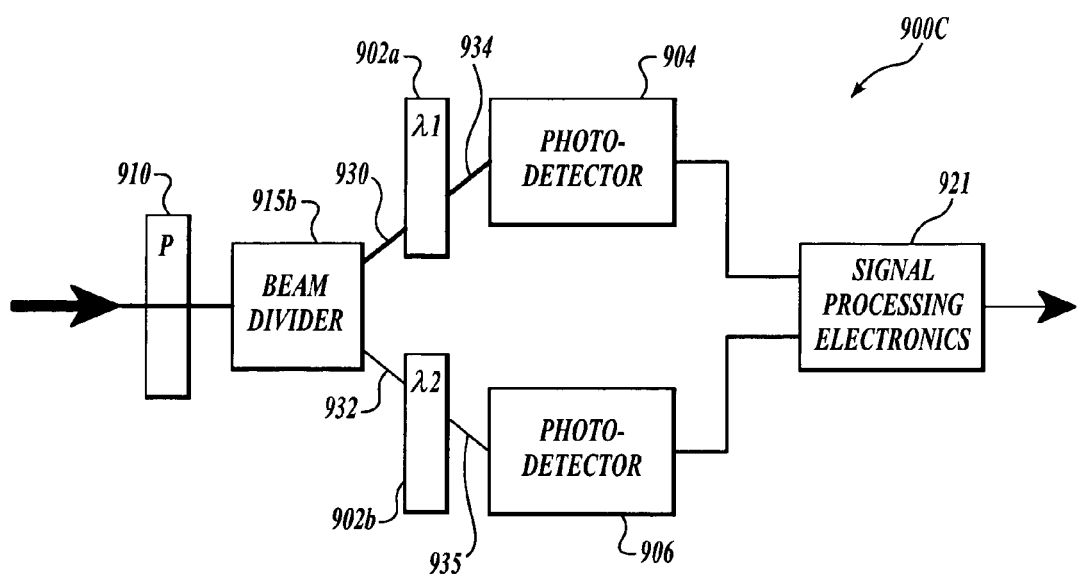

FIG. 9C shows a still further alternative embodiment of a radiation measurement device 900c formed in accordance with the present invention for determining a wavelength-related characteristic of radiation from a radiation source (not shown). The radiation measurement device 900c of this embodiment is similar to the radiation measurement device 900b of FIG. 9B, except that two wavelength-dependent optical elements 902a and 902b are placed to receive the polarized and split beams 930 and 932, respectively, to produce two filtered beams 934 and 935. The power of the first filtered beam 934 is detected by the optical power-measuring detector 904 while the power of the second filtered beam 935 is detected by the optical power-measuring detector 906. As before, the signals from the two optical power-measuring detectors 904 and 906 are thereafter combined and processed by a signal processing unit 921 to determine a wavelength-related characteristic of the radiation.

While various exemplary embodiments of the invention have been illustrated and described, it should be appreciated that the number and configuration/arrangement of polarizer(s), wavelength-dependent optical element(s) (e.g., filters), optical power-measuring detector(s) and various other components used in a radiation measurement device according to this invention may vary depending on each application.

Furthermore, while the various embodiments of the present invention described above all involve the use of one or more polarizers to reduce polarization-dependent errors in a radiation measurement device, polarization-dependent errors may be reduced by other means also. For example, using various commercially available optical elements or devices known to one skilled in the art, an arrangement may be made to depolarize the incident light before entering a radiation measurement device, or to rotate polarization of the light continuously during a (signal processing) signal integration period used when acquiring various measurement signals of the radiation measurement device, to thereby effectively negate or avoid any polarization dependence of the device. As a further example, the incident light may be split into three optical beams to create an additional detector channel (e.g., 3rd detector channel), and the polarization of light in the additional detector channel may be measured using a suitable polarization detector. Any polarization errors can then be numerically compensated for based on predetermined polarization dependent calibrations factors, stored in a look up table or computed according to predetermined analytical functions, and on the detected polarization in the 3rd detector channel. As a still further example, a filter specifically designed and fabricated to have reduced P-S transmission dependence (reduced polarization dependence or polarization sensitivity) may be used as a wavelength-dependent optical element, and/or other elements may be similarly fabricated, to thereby negate or avoid any polarization dependence.

While this invention has been described in conjunction with a number of exemplary embodiments outlined above, various other alternatives, modifications, variations, improvements, and/or substantial equivalents, whether known or presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the claims as filed and as they may be amended are intended to embrace all known or later-developed alternatives, modifications, variations, improvements, and/or substantial equivalents.

The embodiments of the invention in which an exclusive property or privilege is claimed are defined as follows:

1. A radiation measurement device for determining a wavelength-related characteristic of radiation from a radiation source, the radiation measurement device comprising:
 a first beam dividing element located to input at least a portion of the radiation from the radiation source, and to output first and second portions of the radiation along first and second optical paths;
 a first wavelength-dependent optical element located along the first optical path;
 a first optical power-measuring detector located along the first optical path after the first wavelength-dependent optical element to receive radiation filtered by the first wavelength-dependent optical element such that the first optical power-measuring detector outputs a first signal having a first wavelength dependence that depends on the first wavelength-dependent optical element;
 a second optical power-measuring detector located along the second optical path to receive radiation transmitted along the second optical path; and
 a linear polarizer configuration comprising at least one linear polarizer, wherein:
 the second optical power-measuring detector outputs a second signal having a second wavelength dependence that is different from the first wavelength dependence;
 a signal ratio based on at least the first and second signals is indicative of at least one of a radiation wavelength, a change in a radiation wavelength, a radiation frequency, and a change in a radiation frequency, of the radiation from the radiation source; and
 the linear polarizer configuration is arranged such that the signal ratio is substantially insensitive to variations in a polarization orientation of the radiation from the radiation source, the linear polarizer configuration comprising at least one of:
  (a) a linear polarizer located to input radiation from the radiation source and output polarized radiation that is input to the first beam dividing element, and
  (b) at least one linear polarizer arranged to receive the first and second portions of radiation along first and second optical paths and to polarize and transmit the first and second portions of radiation along the first and second optical paths such that each of the transmitted first and second portions of radiation has the same polarization, that polarization consisting of one of:
   (i) approximately only the S-polarized components of radiation from the first beam dividing element, and
   (ii) approximately only the P-polarized components of radiation from the first beam dividing element.

2. The radiation measurement device of claim 1, wherein the wavelength-dependent optical element comprises a bandpass filter.

3. The radiation measurement device of claim 1, wherein the second optical path includes no wavelength-dependent optical element and the second signal is wavelength independent.

4. The radiation measurement device of claim 1, wherein the first beam dividing element is selected from a group consisting of a first grating, and a first beamsplitter that is partially transmissive and partially reflective.

5. The radiation measurement device of claim 1, wherein the linear polarizer configuration comprises element (a) and not element (b).

6. The radiation measurement device of claim 1, wherein the linear polarizer configuration comprises element (b) and not element (a).

7. The radiation measurement device of claim 1, further comprising a signal processing circuit which receives the first and second signals from the first and second optical power-measuring detectors, respectively, and determines the signal ratio based on the first and second signals.

8. The radiation measurement device of claim 1, further comprising a second wavelength-dependent optical element located along the second optical path after the first beam dividing element and before the second optical power-measuring detector, such that the second wavelength dependence depends on the second wavelength-dependent optical element.

9. The radiation measurement device of claim 8, wherein the first and second wavelength-dependent optical elements comprise first and second portions of a single wavelength-dependent optical element, and the first and second optical paths have different respective first and second angles of incidence relative to a surface of the single wavelength-dependent optical element.

10. The radiation measurement device of claim 9, wherein one of the first and second optical paths is incident on the surface of the single wavelength-dependent optical element at a normal angle of incidence.

11. The radiation measurement device of claim 9, wherein the second optical path is incident on the surface of the single wavelength-dependent optical element at a non-normal angle of incidence that is different from the non-normal angle of incidence of the first optical path.

12. The radiation measurement device of claim 9, wherein the linear polarizer configuration comprises element (b), and in element (b) each of at least one linear polarizer provides the same polarization angle which is one of P1) perpendicular to, and P2) parallel to, a plane that is parallel to both the direction of the radiation transmitted along the first optical path and a direction normal to a beam dividing surface of the first beam dividing element and is located such that the radiation received by both the first and second optical power-measuring detectors has been linearly polarized.

13. The radiation measurement device of claim 12, wherein the beam dividing surface comprises a grating having grooves, and the polarization angle is one of P1) perpendicular to, and P2) parallel to, the grooves of the grating.

14. The radiation measurement device of claim 8, further comprising:

a second beam dividing element;

a third beam dividing element;

a third optical power-measuring detector located along a third optical path after a third wavelength-dependent optical element to receive radiation filtered by the third wavelength-dependent optical element, such that the third optical power-measuring detector outputs a third signal having a third wavelength dependence that depends on the third wavelength-dependent optical element; and a fourth optical power-measuring detector located along a fourth optical path after a fourth wavelength-dependent optical element to receive radiation filtered by the fourth wavelength-dependent optical element, such that the fourth optical power-measuring detector outputs a fourth signal having a fourth wavelength dependence that depends on the fourth wavelength-dependent optical element, wherein:

the fourth wavelength dependence is different from the third wavelength dependence; and in element (a):

the linear polarizer is located to input radiation from the radiation source and output polarized radiation to the second beam dividing element, and the second beam dividing element then divides the polarized radiation and outputs it to both the first beam dividing element and the third beam dividing element, and;

the third beam dividing element receives polarized radiation from the second beam dividing element and divides and transmits polarized radiation along the third and fourth optical paths.

15. The radiation measurement device of claim 14, wherein the first and third beam dividing elements comprise portions of a single beam dividing element different from the second beam dividing element.

16. The radiation measurement device of claim 14, wherein the third and fourth wavelength-dependent optical elements comprise portions of a single beam dividing element, and the third and fourth optical paths have different respective angles of incidence relative to a surface of that single wavelength-dependent optical element.

17. A method of determining a wavelength-related characteristic of radiation from a radiation source, the method comprising:

providing a first beam dividing element located to input at least a portion of the radiation from the radiation source, and to output first and second portions of the radiation along first and second optical paths;

providing a first wavelength-dependent optical element located along the first optical path;

operating a first optical power-measuring detector located along the first optical path after the first wavelength-dependent optical element to receive radiation filtered by the first wavelength-dependent optical element, such that the first optical power-measuring detector outputs a first signal having a first wavelength dependence that depends on the first wavelength-dependent optical element;

operating a second optical power-measuring detector located along the second optical path to receive radiation transmitted along the second optical path, such that the second optical power-measuring detector outputs a second signal having a second wavelength dependence that is different from the first wavelength dependence;

providing a linear polarizer configuration comprising at least one of:

(a) a linear polarizer located to input radiation from the radiation source and output polarized radiation to the first beam dividing element, and (b) at least one linear polarizer arranged to receive the first and second portions of radiation along first and second optical paths and to polarize and transmit the first and second portions of radiation along the first and second optical paths such the each of the transmitted first and second portions of radiation has the same polarization, that polarization consisting of one of:

(i) approximately only the S-polarized components of radiation from the first beam dividing element, and (ii) approximately only the P-polarized components of radiation from the first beam dividing element; and determining a signal ratio based on at least the first and second signals, wherein the signal ratio is indicative of at least one of a radiation wavelength, a change in a radiation wavelength, a radiation frequency, and a change in a radiation frequency, of the radiation from the radiation source; and wherein due to the linear polarizer configuration the signal ratio is substantially insensitive to variations in a polarization orientation of the radiation from the radiation source.

18. The method of claim 17, wherein the second optical path includes no wavelength-dependent optical element and the second signal is wavelength independent.

19. The method of claim 17, wherein a second wavelength-dependent optical element is provided along the second optical path after the first beam-dividing element and before the second optical power-measuring detector, such that the second wavelength dependence depends on the second wavelength-dependent optical element.

20. The method of claim 17, wherein the step of providing the linear polarizer configuration provides only one of the elements (a) and (b).

* * * * *

UNITED STATES PATENT AND TRADEMARK OFFICE
CERTIFICATE OF CORRECTION

PATENT NO. : 7,253,902 B2  Page 1 of 1
APPLICATION NO. : 10/814755
DATED : August 7, 2007
INVENTOR(S) : M. Feldman It is certified that error appears in the above-identified patent and that said Letters Patent is hereby corrected as shown below:

| COLUMN | LINE | ERROR |
|---|---|---|
| 22 (Claim 17, | 35 line 38) | "such the each of" should read --such that each of-- |

Signed and Sealed this

First Day of July, 2008

JON W. DUDAS
*Director of the United States Patent and Trademark Office*